United States Patent [19]

Tsuda et al.

[11] Patent Number: 5,175,795

[45] Date of Patent: Dec. 29, 1992

[54] HYBRIDIZED FRAME INFERENCE AND FUZZY REASONING SYSTEM AND METHOD

[75] Inventors: Ryuko Tsuda, Machida; Seiji Yasunobu, Yokohama, both of Japan

[73] Assignee: Hitachi, Ltd., Tokyo, Japan

[21] Appl. No.: 379,580

[22] Filed: Jul. 13, 1989

[30] Foreign Application Priority Data

Jul. 29, 1988 [JP] Japan .............................. 63-188409
Mar. 8, 1989 [JP] Japan .............................. 1-53812

[51] Int. Cl.⁵ .............................................. G06F 15/00
[52] U.S. Cl. .................................. 395/3; 364/DIG 1; 364/274.6
[58] Field of Search ... 364/200 MS File, 900 MS File; 395/3

[56] References Cited

U.S. PATENT DOCUMENTS

| | | | |
|---|---|---|---|
| 4,803,642 | 2/1989 | Muranaga | 364/513 |
| 4,918,620 | 4/1990 | Ulug | 364/200 X |
| 5,012,430 | 4/1991 | Sakurai | 364/513 |

FOREIGN PATENT DOCUMENTS 0210866 7/1986 European Pat. Off. .
0318984 11/1988 European Pat. Off. .

OTHER PUBLICATIONS

Togai et al., "Expert System on a Chip", *IEEE Expert*, vol. 1., No. 3, Fall 1986, pp. 55-62.
R. Fikes et al., "The Role of Frame-Based Representation in Reasoning", *Communications of the Association of Computing Machinery*, Sep. 1985, pp. 904-920.
"A Predictive Fuzzy Control for Automatic Train Operation", S. Yasunobu et al., vol. 28, No. 10, pp. 605-613, 1984.
"The Method of Fuzzy Reasoning in Eshell/SB", K. Tohdoh et al., pp. 25-28.
"Synthesis of Fuzzy Models for Industrial Processes-Some Recent Results", by Richard M. Tong, Int. J. General Systems, 1978, vol. 4, pp. 143-162.
"Industrial Applications of fuzzy logic control," by P. Martin Larsen Int. J. Man-Machine Studies, (1980) 12, pp. 3-10.

*Primary Examiner*—Thomas M. Heckler
*Attorney, Agent, or Firm*—Fay, Sharpe, Beall, Fagan, Minnich & McKee

[57] ABSTRACT

The invention is directed to an inference mechanism to execute human logical and fuzzy thought including intuitive thought. The mechanism consists of two independent engines. One engine is a frame inference engine based on human logical thought. The other engine is a fuzzy reasoning engine base on human fuzzy thought. The mechanism utilizes a common domain control to connect the two engines. After reading in the domain by the fuzzy reasoning engine, the engine draws inferences and writes the fuzzy reasoning result. The conventional inference engine operates in accordance with the results in the domain.

For intuitive thought, for example, a procedure (model) is introduced for realizing an operation or a situation of an object. The frame engine commences execution of the procedure (model). The procedure (model) predicts objectives states under a present condition and outputs a predicted performance value requiring fuzzy reasoning on the domain.

20 Claims, 18 Drawing Sheets

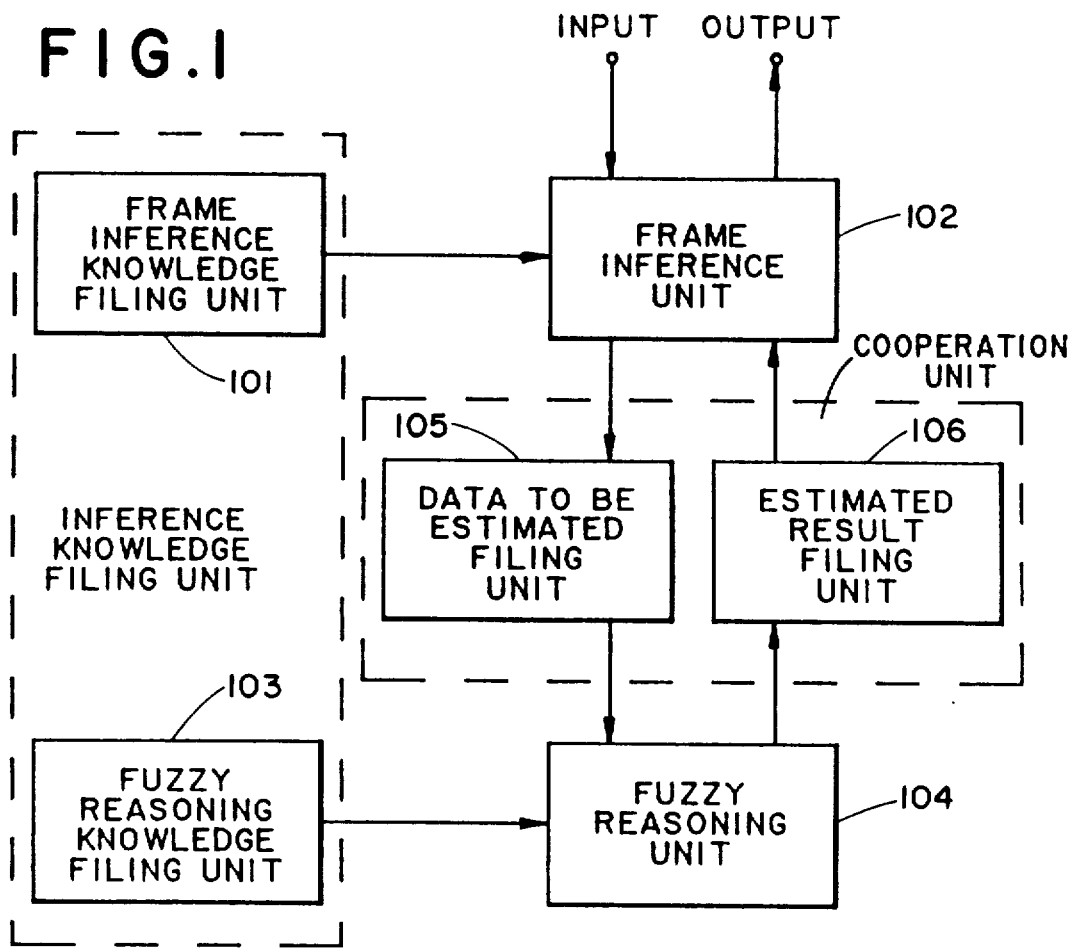
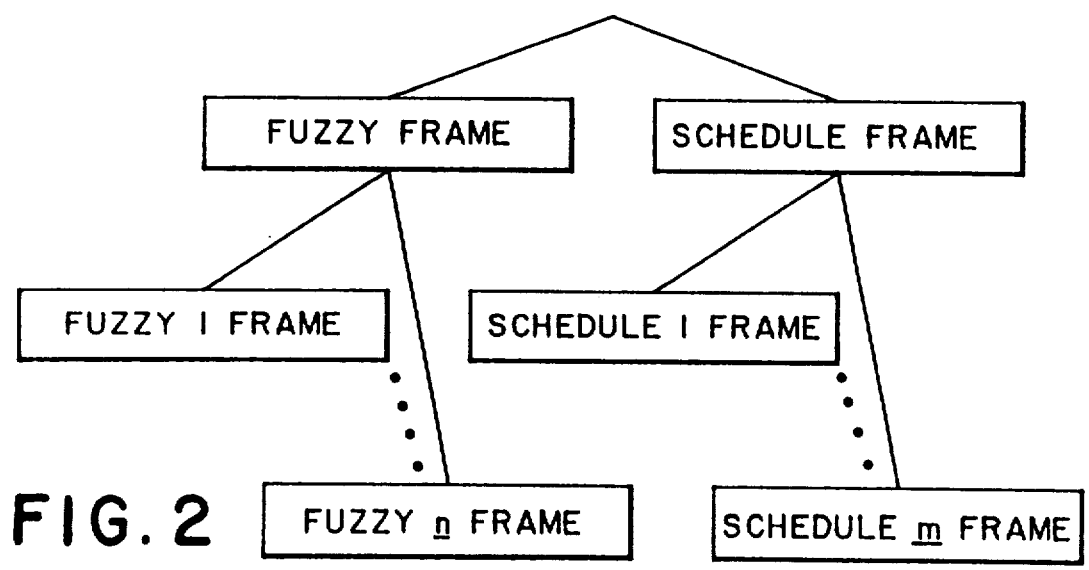

(FUZZY
    INFERENCE METHOD        (DATA-TYPE STRING)
    INFERENCE KNOWLEDGE     (DATA-TYPE STRING)
    INFERRED RESULT PROPOSITION (DATA-TYPE STRING SET 200)
    INFERRED RESULT CERTAINTY   (DATA-TYPE REAL SET 200)
    STEP                    START OF FUZZY INFERENCE
FIG. 3
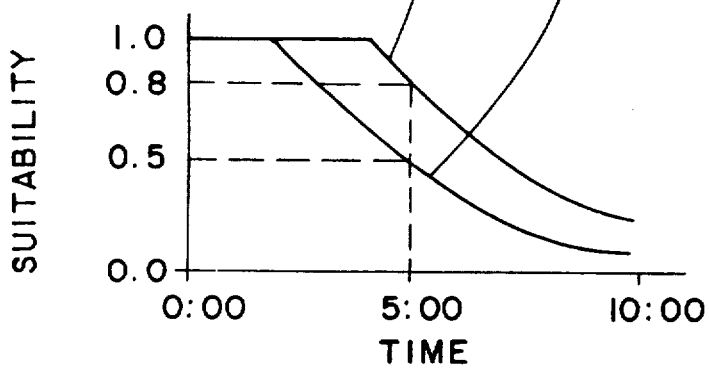
FIG. 4a
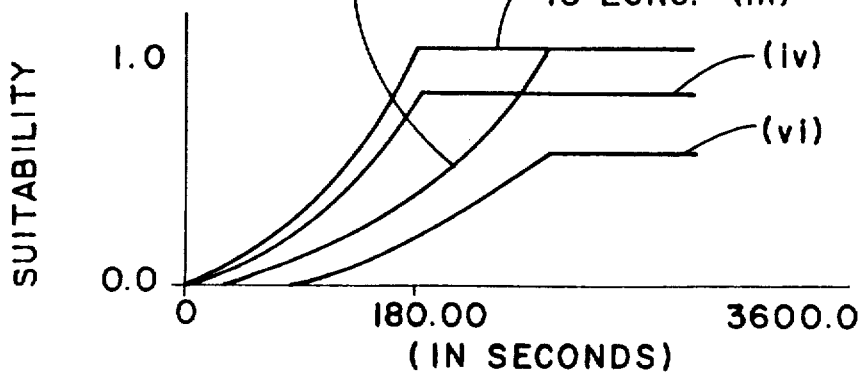
FIG. 4b

| SLOT NAME | SLOT VALUE |
|---|---|
| INFERENCE SCHEME | GRASP EXISITING STATE |
| INFERENCE KNOWLEDGE | FZDATA |
| DEPARTURE PLACE | TOKYO |
| ARRIVAL PLACE | KANAZAWA |
| DESIRED DEPARTURE TIME | 5:00 |
| DESIRED ARRIVAL TIME | 12:00 |
| BUDGET | 20,000 |
| END | |

FIG. 7a  ~105

| PROPOSITION | SUITABILITY |
|---|---|
| THE DESIRED DEPARTURE TIME IS EARLY END | 0.8 |

FIG. 7b  ~106

| PROPOSITION | SUITABILITY |
|---|---|
| THE PERIOD OF TIME REQUIRED FOR TRANSFER IS EXTENDED FOR 15 MINUTES END | 0.8 |

FIG. 7c  ~106

| PROPOSITION | SUITABILITY |
|---|---|
| THE TRANSFER WAIT TIME IS 0.0 | 0.00 |
| THE TRANSFER WAIT TIME IS 19.0. | 0.01 |
| THE TRANSFER WAIT TIME IS 3600.0. END | 1.00 |

| RULE NO. | PROPOSITION OF PROCEEDING PART | | | PROPOSITION OF SUCCEEDING PART | |
|---|---|---|---|---|---|
| | 1 | ~ | M1 | 1 | ~ | M2 |
| 1 | THE DEPARTURE PLACE OF PLAN A IS TOKYO | ~ | | WRITE (THE DEPARTURE PLACE OF PLAN A IS A LARGE CITY) | ~ |
| 2 | THE DEPARTURE PLACE OF PLAN A IS NOT A LARGE CITY | ~ | | THE DEGREE OF CROWDEDNESS OF PLAN A IS MULTIPLIED BY 1.5 | ~ |
| 3 | THE DESIRED DEPARTURE TIME OF PLAN A IS LATE | ~ | | THE DEGREE OF CROWDEDNESS OF PLAN A IS SET AT 1.1 | ~ |
| ... | ~ | ~ | ~ | ~ | ~ |
| M | | ~ | | | ~ |

| PROPOSITION NO. | NAME OF PROPOSITION | NAME OF BASIC FUNCTION | PARAMETER | | | | |
|---|---|---|---|---|---|---|---|
| | | | 1 | 2 | 3 | ... | L1 |
| 1 | THE DESIRED DEPARTURE TIME IS LATE | A | 1000 | 300 | ~ | | ~ |
| 2 | THE DEGREE OF CROWDEDNESS IS HIGH | A | 2.0 | 0.5 | ~ | | ~ |
| ~ | ~ | ~ | ~ | ~ | ~ | | ~ |
| L | | | | | ~ | | ~ |

202

| NO. OF EXECUTABLE RULE | NO. OF RULE | IDENTIFIER | SUITABILITY |
|---|---|---|---|
| 1 | 1 | H | |
| 2 | 3 | F | 0.75 |
| ⁓ | ⁓ | ⁓ | |
| K | | | |

| INFERENCE PROCESS NO. | INFERENCE PROCESS PROPOSITION |
|---|---|
| 1 | THE DEPARTURE PLACE OF PLAN A IS A LARGE CITY. |
| ⋮ | |
| N | |

FIG. 18

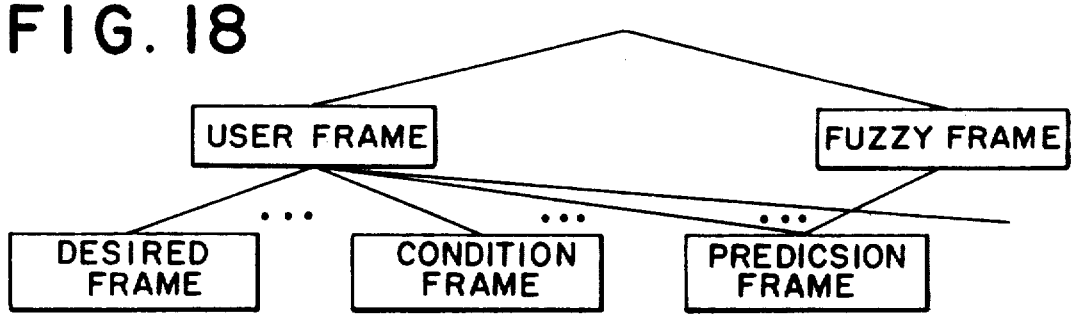

```
(FUZZY
    KNOWLEDGE BASE NAME    (DATA-TYPE STRING)
    ASSUMED VALUE          (DATA-TYPE REAL QUEUE 30)
    CONDITION NAME         (DATA-TYPE REAL QUEUE 10)
    CONDITION VALUE        (DATA-TYPE REAL QUEUE 300)
    RESULT                 (DATA-TYPE STRING)
    CERTAINTY FACTOR       (DATA-TYPE REAL)

PROCEDURE    FUZZY REASONING EXECUTION   { ⋮ }
            ⋮
)
```

FIG. 19

```
(DESIRE
    CLASS            USER
    DRINK            (DATA-TYPE STRING)
    PATTERN          (DATA-TYPE STRING)
                     (RANGE { HOUR, TIME } )
    DESIRED HOUR     (DATA-TYPE INT)
    DESIRED TIME     (DATA-TYPE INT)
)
```

FIG. 20

```
(CONDITION
    CLASS                USER
    HOUR                 (DATA-TYPE INT)
    HEATING POWER        (DATA-TYPE REAL)
    WATER TEMPERATURE    (DATA-TYPE REAL)
    WATER QUANTITY       (DATA-TYPE REAL)
)
```

FIG. 21

(PREDICTION

CLASS

WATER TEMPERATURE    USER, FUZZY

CONSUMPTION-        (DATA-TYPE REAL QUEUE 30)
   QUANTITY              (PROCEDURE, WATER TEMPERATURE
                           CALCULATION)

PROCEDURE

WATER TEMPERATURE    (DATA-TYPE REAL QUEUE 30)
      CALCULATION           (PROCEDURE, ENERGY CALCULATION)

ENERGY CALCULATION

)

HYBRIDIZED FRAME INFERENCE AND FUZZY REASONING SYSTEM AND METHOD

BACKGROUND OF THE INVENTION

The present invention relates to an inference system suited to general expert systems in which problems are solved by utilizing the experience and knowledge items of experts which are set in a computer.

This invention also relates to a reasoning method suitable for expert systems in general for executing a judgement based on logical knowledge and intuitive knowledge.

For an expert system which assists the action and will of a human being, or is substituted therefor, there is a method utilizing knowledge in which the know-how of experts is expressed by inference rules, of the "If-then" type, and by frames storing knowledge items on the states and structures of an object to-be-handled. In this method, a forward/backward inference (hereinbelow termed "frame inference") is as follows.

A forward inference procedure typically includes:
(1) the step of comparing the If-part proposition of the inference rule with the existing state or the state of the object described in the frame, and
(2) the step of executing the Then-part proposition of the inference rule selected on the basis of certainty intuitiveness or the like.

A backward inference procedure typically includes:
(1) the step of selecting the rule in which the Then-part proposition is equal to a goal;
(2) the step of checking if all If-part propositions of the selected rule satisfy a state or the state of the object described in the frame;
(3) the step of regarding the goal as a conclusion when the all If-part propositions satisfy step (2), and proceed to step (6);
(4) the step of going to step (1) when there is an If-part proposition which does not satisfy step (2);
(5) the step of regarding the If-part proposition of the selected rule as a new goal when truth of the proposition cannot be judged, and going to step (1); and
(6) the step of executing the goal.

This inference is strong in the treatment of logical thinking, such as a syllogism based on certain knowledge, but it has problems given that the know-how must be precisely described, and that expression of uncertain or intuitive knowledge is difficult.

In addition to the foregoing, systems employing "fuzzy" reasoning, which systems apply the fuzzy reasoning theory, are becoming increasingly popular as an expedient for expressing the inexactness or fuzziness of human knowledge.

Such fuzzy reasoning estimates a current state fuzzily and arrives at a problem solution by use of inference rules which are defined in the form of membership functions. With fuzzy reasoning, the treatment of fuzzy knowledge is permitted, and know-how may be described roughly.

Fuzzy reasoning, however, has a drawback given that propagation error of fuzziness progressively increases in a multistage inference operation.

In general, a human being determines his will for a given situation through a combination of uncertain knowledge and certain knowledge. Both the uncertain knowledge and the certain knowledge must be dealt with appropriately in order that inferences may be drawn by large-scale use of knowledge items in conjunction with a decision making process.

There has recently been proposed an expert system in which performance is enhanced by using a hybridization of the two inferencing systems such that each one compensates for the drawbacks of another one Such a system has been proposed in "Fuzzy Operation Function of ESHELL/SB" (Proceedings of the First Conference of Japan Society for Artificial Intelligence, in 1987, pp. 25-28).

The proposed expert system operates on a work station in an operation in which a membership function is defined in a frame. Suitability to a state is calculated from the membership function, and is used for derivation of an inference as a certainty. That is, a method in which the fuzzy reasoning incorporated into the frame inference scheme is adopted.

The afore-noted hybridized inferencing technique does not take it into account that human beings judge situations by utilizing both uncertain knowledge and certain knowledge. This has resulted in a problem that in inference schemes, it is inevitable that expressions of rules descriptive of the human knowledge items be inefficiently redundant. As a result, a long time must be expended for putting the human knowledge items into rules.

Moreover, in cases in which the earlier hybridized system is applied to an object system for which real time processing is required, the redundancy problem renders the scale of the system itself large and the response thereof slow. As a result of this problem, the earlier system is not used as an application per se, but is used as preestimative system for the application. Accordingly, the knowledge items, such as rules, constructed in the preestimative system in a work-station environment cannot be directly mounted on a microcomputer for to realizing real time processing. This has led to a further problem that a transplanting of the knowledge items into a microcomputer environment requires a great amount of modifications and time investments.

Further, man sometimes decides the conclusion after he expects the result This intuitive thought is executed by the predictive fuzzy reasoning method which was proposed in "A Predictive Fuzzy Control for Automatic Train Operation" (System & Control, vol. 28, No. 6, pp 605-613, 1984). This method uses rules derived from skilled human experiences and selects the most likely conclusion based on the prediction of results and on the direct evaluation to achieve an object efficiently and effectively.

However, this method is not combined with a frame engine, and higher efficiency is not attained.

Hereinafter, this method will be explained in more detail. Expert systems for executing for intuitive judgement and logical judgement of man have been examined in various fields. As the assistant tool, systems for executing for intuitive judgement by fuzzy reasoning and logical judgement by frame inference are disclosed in "Fuzzy Operation Function of ESHELL/SB" (Proceedings of the First Conference of Japan Society for Artificial Intelligence, 1987, pp. 25-28) . The fuzzy reasoning discussed in the prior art reference dealt with hereby can be said to be a state evaluation type fuzzy reasoning which evaluates a state value as it is.

On the other hand, the above predictive fuzzy reasoning system makes predictive calculation from a state value by use of a procedure and evaluates the predicted value (water temperature after five minutes, for example).

This system describes the human knowledge by use of a predictive fuzzy rule with the form of:

When (heating power is set to 1)
If (water temperature after five minutes is just good)
Then (heating power is set to 1).

A reasoning engine assumes When-part in each rule of the above type for one rule group, calculates the state of the If-part (water temperature after five minutes in the case described above) by use of a procedure and determines the evaluation value of each rule. Here, the minimum evaluation value is adopted when a plurality of conditions of the If-part exist. Next, the Then-part of the rule having the highest evaluation value is adopted as the conclusion. The above is the summary of the processing procedures of the predictive fuzzy reasoning.

The expert system described above does not take into account the point that the intuitive judgement is derived after the conclusion is predicted, and involves the problem that expert system configuration by the predictive fuzzy reasoning is difficult.

SUMMARY OF THE INVENTION

The first object of the present invention is the provision of a system which is able to compact knowledge items, such as rules, and smoothly transplant them into a microcomputer environment.

The second object of the present invention is the provision of a system which provides an inference which flexibly executes inferences, based on both uncertain and certain knowledge, which system thereby affords a close analog to inferencing patterns drawn by human beings.

The third object of the present invention is to provide a method which can combine the frame inference with the predictive fuzzy reasoning system to improve the efficiency of the predictive fuzzy reasoning.

The fourth object of the present invention is to provide a method which can easily select state evaluation type fuzzy reasoning and predictive fuzzy reasoning on the frame inference side, depending on the object of application.

The above objects are achieved by executing frame inferences which utilize knowledge items described in the forms of rules and frames, independently from fuzzy reasoning which utilizes knowledge items expressed in the forms of rules and membership functions, and by furnishing the inferences of each type with means for keeping cooperation with the inferences of the other type. This cooperation can be realized by forming a common domain for the frame inference and fuzzy reasoning.

The above objects are also achieved by providing means for deciding whether an If-part proposition of each of a set of rules is a frame inference proposition based on certain knowledge or a fuzzy reasoning proposition based on uncertain knowledge; means for selecting a rule to be used for drawing a conclusion by use of a scheme corresponding to the sort of the If-part proposition, and for registering the selected rule as an executable rule; and means for drawing the conclusion by use of the executable rule.

In the inference method of the present invention, the frame inference is initially carried out in the first place, and the fuzzy reasoning is started, if necessary. A fuzzy frame is prepared for the frame inference. The fuzzy frame is configured of slots for setting the name of knowledge for the fuzzy reasoning, a fuzzy reasoning scheme and an inferred result, and the procedure for starting the fuzzy reasoning.

A frame inference engine compares the If-part proposition of a rule with a situation, the facts of an object world described with a frame by a user, and the inferred result slot of the fuzzy frame, thereby to select a rule of the If-part proposition which has been satisfied. It executes contents described in the Then-part proposition of the selected rule. If, on that occasion, a procedure to start fuzzy reasoning is written in the Then-part proposition, the frame inference engine transfers data described in the fuzzy frame together with the name of knowledge for the fuzzy reasoning, the fuzzy reasoning scheme and procedure for starting the fuzzy reasoning, to a fuzzy reasoning engine which completes this fuzzy reasoning.

The fuzzy reasoning engine optimally utilizes three types of inference methods: (1) grasping a current state, (2) selecting a command and (3) defining the meaning of a proposition. The fuzzy reasoning is executed according to one of the three inference schemes which is specified in the fuzzy reasoning scheme slot of the fuzzy frame, of the knowledge in the fuzzy reasoning knowledge name slot by use of the fuzzy frame, as well as the data transferred by the frame inference. The result of the fuzzy reasoning is set to the fuzzy frame.

Meanwhile, in the method which employs the means for deciding either a frame inference proposition or a fuzzy reasoning-wise proposition, each If-part proposition is first decided as the frame inference proposition if description relating to the If-part proposition exists in the frame and a working memory, and as the fuzzy reasoning proposition if the meaning of the If-part proposition is defined by a membership function. In neither of the cases, is the kind of the proposition queried from the user.

Subsequently, an executable rule is registered. In the case of a frame rule which contains the frame inference propositions in the If-part thereof, the frame rule is selected as the executable rule if all the frame inference propositions are true. On the other hand, if a fuzzy rule has its If-part consisting of only the fuzzy reasoning propositions, it is selected as the executable rule.

If there is a frame rule among the executable rules, a conclusion is drawn by use of the frame rule in conformity with a predetermined strategy. In a case where there is no frame rule among the executable rules, a conclusion is drawn with all the executable rules according to a predetermined strategy.

In this way, knowledge items extracted from experts can be set independently in accordance with the properties thereof (certainty and uncertainty). In the operation of transplanting the system into a microcomputer environment, only the knowledge items constructed on a work station and the necessary functions of the individual inferences must be incorporated, so that the efficiency of transplantation into the microcomputer is enhanced.

Furthermore, the uncertain knowledge and the certain knowledge can be described in the same rule, and the two inferences are separated according to the sorts thereof, so that an overall judgement can be formed.

To achieve the third and fourth object, a fuzzy, reasoning engine and a frame inference engine are kept in cooperation or combined by use of a procedure for realizing an operation or a situation of an object and by use of a common domain for storing an inferred result to be utilized by another engine mutually. Predictive fuzzy reasoning is executed by use of a frame rule, and several conclusions described in Then-part of fuzzy rules are selected as candidates for one final conclusion. Assuming each candidate as a conclusion, a future state of the object is predicted by use of the procedure.

According to the predicted result, fuzzy reasoning is executed.

The above means for keeping cooperation with the inference of the other type comprises (1) means for reading a fuzzy rule and judging whether the fuzzy rule is for a state evaluation type fuzzy reasoning or a predictive fuzzy reasoning, (2) means for executing a procedure (model) on the basis of the value assumed in each fuzzy rule when the fuzzy rule is for the predictive fuzzy reasoning, to calculate the predicted state value and writing the predicted value together with a fuzzy knowledge base name into the common domain, (3) means for writing the state value together with the fuzzy knowledge base name to the common domain when the fuzzy rule is for the state evaluation type fuzzy reasoning, with means (1) to (3) being provided on the frame inference side, (4) means for reading the fuzzy knowledge base name, the state value or the predicted state value from the common domain and (5) means for writing the result of the fuzzy reasoning to the common domain with the means (4) and (5) being provided on the fuzzy reasoning side.

The present invention prepares a fuzzy frame having a fuzzy reasoning execution procedure which is comprised by assembling the knowledge base name slot for storing in advance a knowledge base name according to the frame inference, the means (1), the means (2), the means (3) and means for starting the fuzzy reasoning.

In the reasoning system of the present invention, the frame inference is first operated. The frame inference compares the If-part proposition of the frame rule, the fact of the object world inside a frame and the result of fuzzy reasoning stored in the common domain, selects the frame rule satisfying all the If-part propositions and executes the content of the Then-part of the frame rule. In the Then-part proposition are described both the frame name and the processing instruction. If the fuzzy rule is for the predictive fuzzy reasoning, the procedure (model) for the predictive calculation is prepared for each slot inside the frame. If the fuzzy reasoning execution instruction is described in the Then-part proposition, the knowledge base name slot value of the fuzzy frame is stored in the common domain.

Next, from the knowledge base a fuzzy rule is read and whether the fuzzy rule is for the state evaluation type fuzzy reasoning or for the predictive fuzzy reasoning is judged. If the fuzzy rule is for the state evaluation type fuzzy reasoning at this time, the slot value in the frame described in the Then-part of the rule is written to the common domain. If it is for the predictive fuzzy reasoning, on the other hand, the procedure model in each slot of the frame designated by Then-part of a frame rule is sequentially started by use of the concluded value assumed in the Then-part of each of the fuzzy rules that have been read previously. A state is predicted by use of the model and set to the corresponding slot and thereafter stored in the common domain. Then, the fuzzy reasoning is started.

On the fuzzy reasoning side, first the knowledge base name and the state value are read first from the common domain, fuzzy reasoning is executed by use of the fuzzy rule inside the fuzzy knowledge base, a membership function and the state value of the result is stored in the common domain.

On the frame inference side, the common domain is referred to when the fuzzy reasoning result becomes necessary and it is utilized for frame inference.

Accordingly, since the fuzzy knowledge base is read and predictive calculation is made on the frame inference side, the predictive fuzzy reasoning system can be accomplished. Since whether the fuzzy knowledge base is for the state evaluation type fuzzy reasoning or for the predictive fuzzy reasoning is judged automatically on the frame inference side, the user can easily connect the frame inference with the fuzzy reasoning.

Further advantages of the present invention will become apparent from the following detailed description and the drawings.

BRIEF DESCRIPTION OF THE DRAWINGS

The invention will be described in conjunction with certain figures wherein:

FIG. 1 is a block diagram of an embodiment of the present invention;

FIG. 2 is a diagram of the frame structure of a frame inference knowledge filing unit;

FIG. 3 is a diagram of the format of a fuzzy frame;

FIGS. 4a and 4b show examples of membership functions;

FIGS. 7a-7d show the contents of the tables of a data to-be-estimated filling unit and an estimated result filing unit;

FIGS 9a and 9b are diagrams of the table formats of rules and proposition meanings in an inference knowledge unit;

FIG. 18 is an explanatory view of the hierarchy of a frame inside the frame knowledge;

FIG. 19 is an explanatory view of the configuration of the fuzzy frame;

FIG. 20 is an explanatory view of the configuration of a desired frame;

FIG. 21 is an explanatory view of the configuration of a condition frame;

DETAILED DESCRIPTION OF THE PREFERRED AND ALTERNATE EMBODIMENTS

Figure 5:
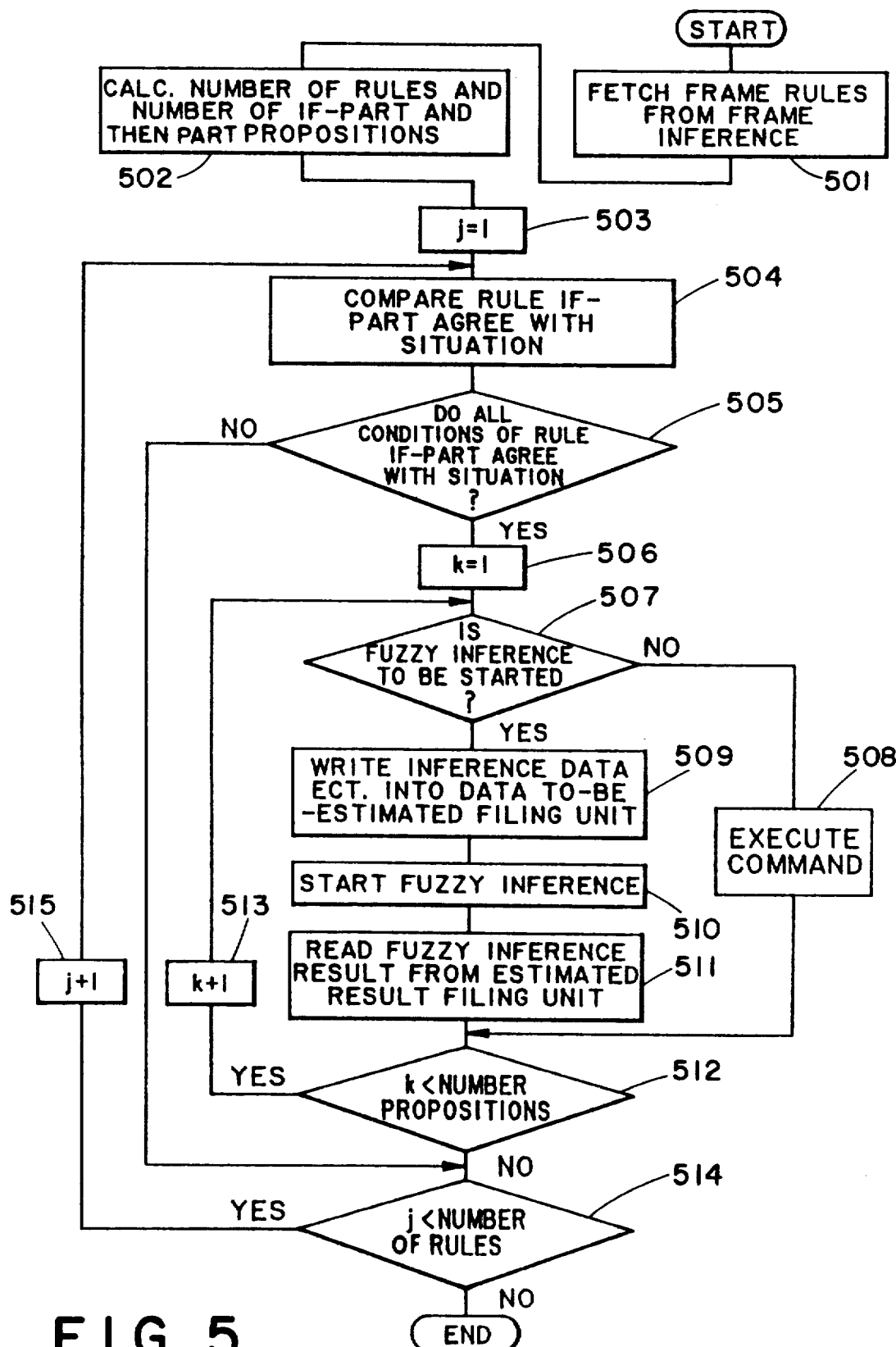
FIG. 5 is chart showing the processing steps of a frame inference.

Turning now to the figures wherein the showings are for purpose of illustrating the preferred and alternate embodiments only, and not for the purposes of limiting the same, FIG. 1 illustrates a block diagram of one embodiment of a knowledge processing system of the present invention. In FIG. 1, numeral 101 indicates a frame inference knowledge filing unit which accumulates therein frame rules described in an If-Then format, and frames describing states of selected universe. Numeral 102 represents a frame inference unit which executes an inference by use of knowledge of the frame inference knowledge filing unit 101. Numeral 103 represents a fuzzy reasoning knowledge filing unit, which accumulates therein propositions having their meanings defined by membership functions, and fuzzy rules described in the If-Then format. Numeral 104 represents a fuzzy reasoning unit which executes a fuzzy reasoning by use of knowledge of the fuzzy reasoning knowledge filing unit 103. Numeral 105 represents a data to-be-estimated filing unit which accumulates therein inference knowledge name, inference schemes, and data, which are required for fuzzy reasoning at the fuzzy reasoning unit 104. Numeral 106 represents an estimated result filing unit which stores fuzzy reasoning results therein.

FIG. 2 shows an example of a hierarchy of the frames which are filed in the frame inference knowledge filing unit 101. The example shown in FIG. 2 consists of a fuzzy frame and a schedule frame originated by a user. Fuzzy 1 frame, . . . fuzzy n frame, and schedule 1 frame, . . . schedule m frame, take over slots of the host frames and set data for fuzzy reasoning and the universe or object world data, respectively.

FIG. 3 shows the format of the fuzzy frame. The fuzzy frame includes slots for an inference method or scheme in another word, an inference knowledge name, an inferred result proposition, and an inferred result certainty. The inference method slot serves to designate the scheme of the fuzzy reasoning, and it designates any of the character strings of: "Grasp the existing state," "Select a command," and "Define the meaning of a proposition." The inference knowledge name slot serves to designate a fuzzy reasoning knowledge name. The two slots of the inferred result proposition slot and the inferred result certainty slot form a pair, and they set executed results of the fuzzy reasoning unit 104, in a number up to By way of example, when the fuzzy reasoning result is "The certainty of 'A train bound for Tohoku will be retrieved is 0.5, the character string "A train bound for Tohoku will be retrieved." is set in the inferred result proposition slot, and the numerical value "0.5" is set in the inferred result certainty slot. In addition, the procedure for starting the fuzzy reasoning is prepared.

FIG. 4 illustrates membership functions. In FIG. 4(a) a desired departure time is used as a performance index which defines "The desired departure time is early." ((i)) and "The desired departure time is very early." ((ii)). On the other hand, 4(b) uses a transfer wait time as a performance index which defines "The transfer wait time is long." ((iii), (iv)) and "The transfer wait time is very long." ((v) and (vi)).

FIG. 5 is a flow chart which shows the processing steps of the frame inference according to the present invention. Numerals 501-515 indicate the individual steps.

Figure 6:
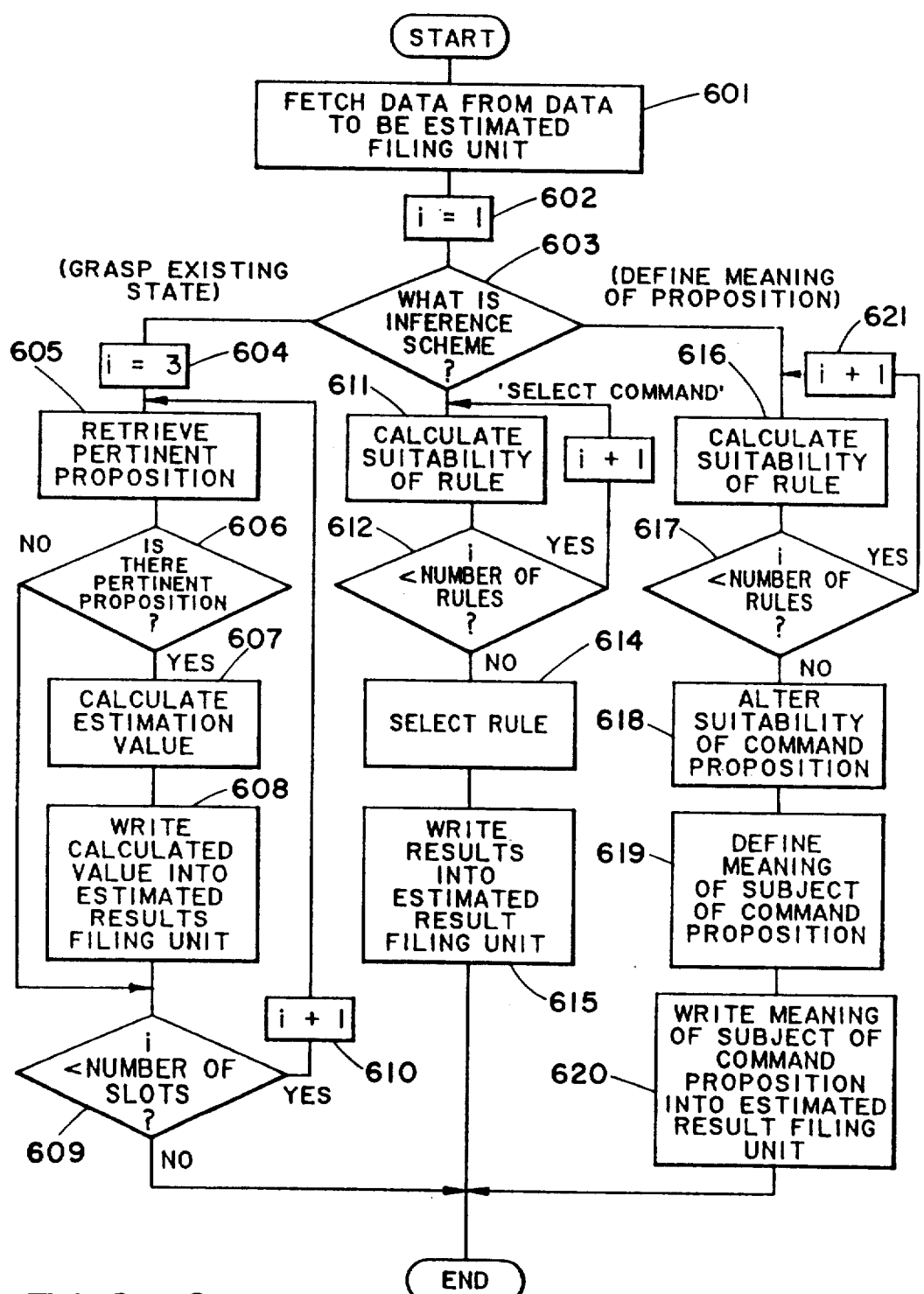
FIG. 6 is a flow chart showing the processing steps of a fuzzy reasoning.

FIG. 6 is a flow chart which shows the processing steps of the fuzzy reasoning according to the present invention. Numerals 601-621 indicate the individual steps.

FIG. 7 shows the tables of the data to-be-estimated filing unit 105 and the estimated result filing unit 106. In FIG. 7, the data to-be-estimated filing unit 105 of FIG. 7(a) is set before the fuzzy reasoning unit 104 is started by the frame inference unit 102. Slot values of the inference scheme slot and inference knowledge slot of the fuzzy frame, and the slot names and slot values of frames necessary for the fuzzy reasoning are set in succession. The estimated result filing unit 106 of FIG. 7(b) accumulates the fuzzy reasoning results when the fuzzy reasoning scheme is "grasping the existing state," the estimated result filing unit 106 of FIG. 7(c) accumulates them when it is "selecting a command," and the estimated result filing unit 106 of FIG. 7(d) accumulates them when it is "defining the meaning of a proposition." Proposition and certainties are set in FIG. 7(b)-(d). Here, each of the tables of FIG. 7(a)-(d) can set up to 200 items of data, and 'END' is affixed to the end of the data in the inferred result proposition slot.

Next, the operation of this embodiment will be described in detail with reference to FIGS. 5 and 6.

The frame inference unit 102 fetches frame rules filed in the frame inference knowledge filing unit 101 (501), it finds the number of the frame rules and the numbers of the If-part propositions, and the Then-part propositions, of each of the frame rules (502), and it sets frame rule No. j to 1 (503). It checks if a respective If-part proposition of the j-th frame rule meets the states of the object world described in a frame (for example, the contents of the schedule 1 frame . . . schedule m frame in FIG. 2), and the contents of the inferred result proposition slot and inferred result certainty slots of a fuzzy frame (504).

When all the If-part proposition of the j-th frame rule meet the above situation (505), the Then-part proposition No. k of the j-th frame rule is set to 1 (506), and steps 507 through 511 are executed. However, if any of the proposition is not met (505), the processing flow jumps to step 514.

When the k-th Then-part proposition of the j-th frame rule is not for commencing a fuzzy reasoning (507), the Then-part proposition thereof is executed (508). When the k-th Then-part proposition is the execution of the fuzzy reasoning at step 507, steps 509-511 are completed. An inference knowledge name, an inference scheme, which are stored in any of the fuzzy 1 frame . . . fuzzy n frame, and data to be estimated by the fuzzy reasoning, as obtained by the k-th Then-part proposition, are first output to the data to-be-estimated filing unit 105 (509), whereupon the fuzzy reasoning is started (510). It is assumed, by way of example, that the inference scheme slot of the fuzzy 1 frame is "Grasp the existing state," while the inference knowledge name slot is "FZDTAT." that the schedule frame 1 is:

| (Schedule 1) | |
|---|---|
| Set | OK |
| Departure place | Tokyo |
| Arrival place | Kanazawa |
| Desired departure time | 5:00 |
| Desired arrival time | 12:00 |
| Budget | 20.000). | and that the j-th frame rule is:

If (Schedule 1 (Set)=OK)
then (Start fuzzy reasoning (Fuzzy 1, Schedule 1 (Departure place), Schedule 1 (Arrival place), Schedule 1 (Desired departure time), Schedule 1 (Desired arrival time), Schedule 1 (Budget))

Then, the table of FIG. 7(a) is obtained when slot names and slot values are written into the data to-be-estimated filing unit 105, in this order, as to the inference scheme slot and inference knowledge name slot of the fuzzy 1 frame, and the slots of the departure place, arrival place, desired departure time, desired arrival time, and budget, in the schedule 1 frame. These frames being described after the step of starting the fuzzy reasoning.

As shown in FIG. 6, the fuzzy reasoning unit 104 fetches the contents stored in the data to-be-estimated filing unit 105, and fuzzy rules and propositions with their meanings defined by membership functions in the fuzzy reasoning knowledge filing unit 103, as designated by the inference knowledge of the data to-be-estimated filing unit 105. It also finds the number of slots and the number of the fuzzy rules (601), whereupon it sets i to 1 (602). Here, propositions which constitute the If-parts and Then-parts of the fuzzy rules are selected from among the propositions defined by the membership functions.

Subsequently, the inference method designated by the data to-be-estimated filing unit 105 is judged (603).

When the inference method is: "Grasp the current state" at the step 603, i signifies a number of the slot fetched from the data to-be-estimated filing unit 105, and it is altered to 3 (604). The contents of the fuzzy reasoning knowledge filing unit 103 are retrieved in search of a proposition whose subject is the i-th slot name (605). In the absence of the pertinent proposition (606), the processing flow jumps to step 609. In the presence of the pertinent proposition at step 606, an estimation value is calculated from the membership function defining the proposition and the slot value of the slot name which is equal to the subject name of the proposition (607), and the calculated value is filed in the estimated result filing unit 106 (608).

By way of example, when the desired departure time is 5:00 as indicated in FIG. 7(a) and "The desired departure time is early." is defined as indicated at (i) in FIG. 4(a), the estimation value becomes 0.8, which value is written in the estimated result filing unit 106 in the format shown in FIG. 7(b). When the slot No. i is less than the number of slots (609), it is rendered +1 (610), and the processing flow jumps to step 605. When the slot No. i is not less than the number of slots at step 609, the fuzzy reasoning is ended.

When the inference method is "Select a command" at step 603, i signifies a number of the fuzzy rule. Then, suitability between the i-th fuzzy rule and the slot data in the data to-be-estimated filing unit 105 is calculated. A method for calculation is such that the membership function which signifies the If-part proposition of the fuzzy rule is computed using a slot value which agrees with the subject of the If-part proposition, and that the computed value is set as the suitability of the fuzzy rule (611).

By way of example, when the i-th fuzzy rule is Fuzzy rule i:

If (the desired departure time is early) then (the required transfer time is extended for 15 minutes) and the desired departure time in the data to-be-estimated filing unit 105 is 5:00, the suitability of "The desired departure time is early" is 0.8 in view of (i) in FIG. 4(a), and the suitability of the fuzzy rule i becomes 0.8. If the fuzzy rule No. i is less than the number of fuzzy rules (612), i is rendered to +1 (613), and step 611 is repeated until the fuzzy rule No. i becomes at least the number of fuzzy rules. Subsequently, among these fuzzy rules, one exhibiting the maximum suitability is selected (614), and the suitability between the selected fuzzy rule and the Then-part proposition thereof is written down in the estimated result filing unit 106 (615), whereupon the fuzzy reasoning is ended.

By way of example, when the fuzzy rule i employed in the foregoing is selected, "The required transfer time is extended for 15 minutes." and the suitability of 0.8 are written to the estimated result filing unit 106 in the format shown in FIG. 7(c).

When the inference method is "Define the meaning of a proposition" at step 302, i signifies the No. of a fuzzy rule. The suitability between the i-th fuzzy rule and the content of the data to-be-estimated filing unit 105 is evaluated in the same manner as at step 611 (616). If the fuzzy rule No. i is less than the number of fuzzy rules (617), i is rendered to +1 (618), and step 616 is repeated until the fuzzy rule No. i becomes at least the number of fuzzy rules. The membership function which defines the Then-part proposition of the i-th fuzzy rule is altered. By letting P1 denote the suitability of a fuzzy rule R1 (l=1, n), and $$\mu_{R_l}(x)$$

$$X_{min} \leq x \leq X_{max}$$

denote the membership function of the Then-part proposition thereof, the membership function is put into $\mu'_{Rl}(x) = P_l \times \mu_{Rl}(x)$ ($X_{min} \leq x \leq X_{max}$) (618). Subsequently, using the membership functions of the Then-part propositions of the respective fuzzy rules as share a subject, the meaning of the subject is defined again. A method therefor is such that, letting $R_1, \ldots$ and $R_m$ denote the fuzzy rules sharing the command subject of the Then-part proposition, and $\mu'_{R1}(x)$ ($X'_{min} \leq x \leq X'_{max}$), ... and $\mu'_{Rm}(x)$ ($X'_{min} \leq x \leq X'_{max}$) denote the membership functions of the respective Then-part propositions, the subject of the Then-part propositions is put into $\mu_s(x) = \min \{\mu'_{R1}(x), \ldots \mu'_{Rm}(x)\}$ $$X'_{min} \leq x \leq X'_{max}$$

(619). Further [$X_{min}$, $X_{max}$] is divided into 200 parts, and the suitability $\mu(x_s)$ of the individual points $x_s = X_{min} + (X_{max} - X_{min})/199 \times (s-1)$ (s=1,200) are written into the estimated result filing unit 106 (620). By way of example, when the fuzzy rule is If (the desired departure time is early) then (the transfer wait time is long), the fuzzy rule $R_{22}$ is If (the desired departure time is very early) then (the transfer wait time is very long), "The desired departure time is early", "The desired departure time is very early", "The transfer wait time is long" and "The transfer wait time is very long" are defined as (i), (ii), (iii) and (v) in FIG. 4, respectively, and the desired departure time is set at 5:00. On this occasion, the suitability of the fuzzy rules $R_{21}$ and $R_{22}$ become 0.8 and 0.5 in view of (i) and (ii) in FIG. 4, respectively. At step 618, the membership function of "The transfer wait time is long" is altered from (iii) to (iv) in FIG. 4, and the membership function of "The transfer wait time is very long" is altered from (v) to (vi). At step 619, the minimum value of (iv) and (vi) in FIG. 4 is taken, and the meaning of the "transfer wait time" is put into a form shown at (vi) in FIG. 4. At step 620, [0.0, 3600.0] is divided into 200 parts, and suitability at respective points are stored as shown in (d) of FIG. 7.

The frame inference unit fetches the contents of the estimated result filing unit 106, and it sets the propositions in the inferred result proposition slots of fuzzy frames and the suitability in the inferred result certainty frames of the fuzzy frames (511).

Steps 507-511 are repeated by subjecting k to +1 (513) as long as the Then-part proposition No. k of the j-th frame rule is less than the number of the Then-part propositions thereof (512). When k becomes at least the number of the Then-part propositions, step 514 is executed.

When the frame rule No. j is less than the number of frame rules (514), j is rendered +1 (515), and the processing flow jumps to step 504. When j has become at least the number of the rules, all the steps are ended.

Although, in this embodiment, the number of divisions has been fixed to 200 at step 616, the number may well be designated for every subject by the fuzzy reasoning knowledge filing unit 103.

According to this embodiment, knowledge items to be utilized for inferences can be systematically classified, and hence, there is the effect that the efficiency of the operation of transplanting the knowledge items into a microcomputer is enhanced.

Figure 8:
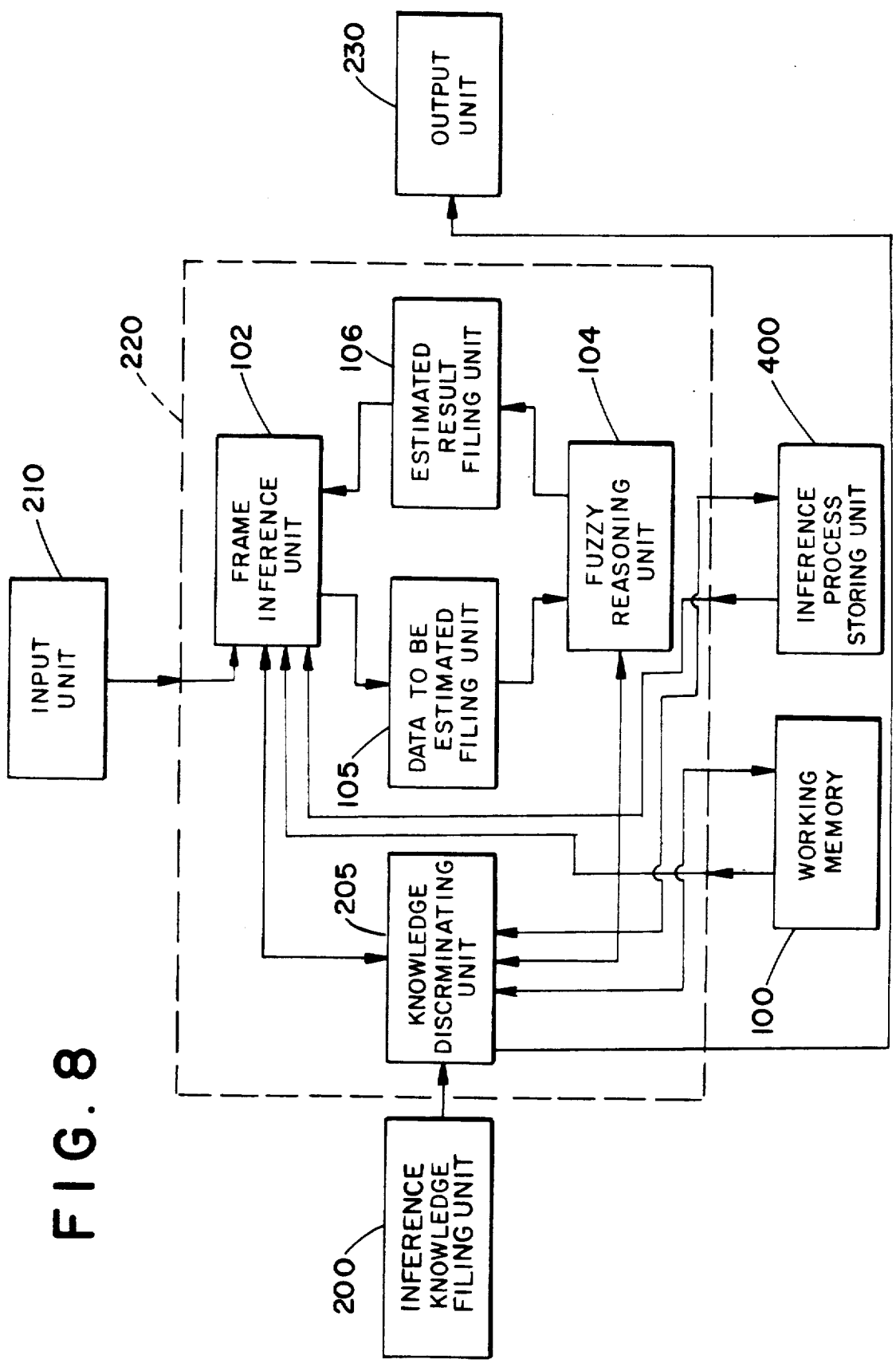
FIG. 8 is a block diagram of the second embodiment of an inference system which realizes the present invention.

Now, the second embodiment of the present invention will be described. FIG. 8 is a block diagram of the second embodiment of an inference method which realizes the present invention. In the figure, numeral 100 indicates a working memory (hereinbelow, abbreviated to "WM") which temporarily files an inferred result; numeral 200 an inference knowledge unit which files rules describing the experiences and knowledge items of human beings, frames indicating the facts of an object world, and the meanings of propositions as defined by membership functions; numeral 210 an input unit which serves to query a user about the type of the proposition of a If-part, when this type cannot be decided from either of the WM 100 and the inference knowledge unit 200. Numeral 220 represents an inference unit, analogous to that disclosed in FIG. 1, which executes a fuzzy reasoning or a frame inference on the basis of the content of the inference knowledge filing unit 200, the content of the WM 100 and the information obtained from the input unit 210, as determined by knowledge discriminating unit 205. Numeral 230 represents an output unit which outputs an executed result of the inference unit 220.

FIGS. 9(a) and (b) are table diagrams of the rules and the proposition meanings in the inference knowledge unit 200. A rule table 201 in (a) of FIG. 9 can set the rules in a number up to M. In each of the rules, the propositions of a If-part in a number up to M1 and those of a Then-part in a number up to M2 can be defined. The rules indicated at 201 in (a) of FIG. 9 by way of the following three examples:

(Rule-1) If (the departure place of Plan A is Tokyo) then (write (the departure place of Plan A is a large city)), (Rule-2) If (the departure place of Plan A is not a large city) then (the degree of crowdedness is multiplied by 1.5), and (Rule-3) If (the desired departure time of Plan A is late) then (the degree of crowdedness of Plan A is set at 1.1).

Here, the Then-part of the (Rule-1) signifies that the proposition "the departure place of Plan A is a large city" is to be written into the WM 100. A proposition meaning table 202 in FIG. 9(b) can define propositions in a number up to L, and for each of the propositions, it files a proposition name, a basic function type, and parameters in a number up to L1, in this order.

By way of example, the proposition of "The desired departure time is late" is set as indicated at proposition No. 1 in the table 202.

Figures 10, 11:
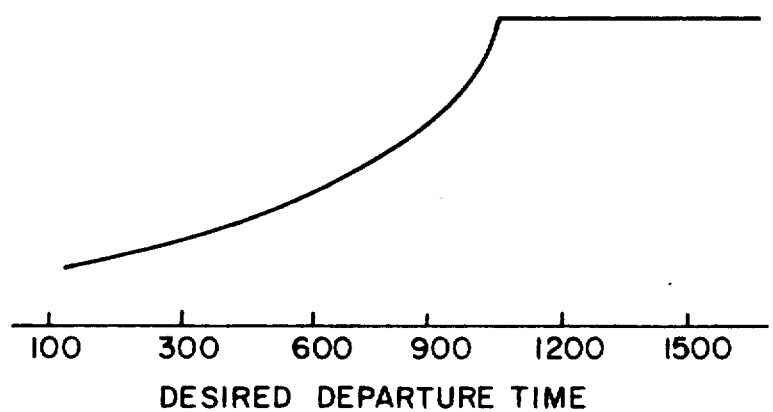
FIG. 10 shows an example of a membership function.
FIG. 11 is a diagram of the table format of an inference process unit.

FIG. 10 shows an example of a membership function. In FIG. 10, the example 301 sets the meaning of the proposition of "The desired departure time is late." by regarding the desired departure time as a performance index.

FIG. 11 is a table format diagram of the inference process unit 400. In FIG. 11, executable rules in a number up to K can be filed. For each of the executable rules, the rule No. of the rule in the inference knowledge unit 200 and the sort of the rule, 'H' identifying a frame rule or 'F' identifying a fuzzy rule are set in the order mentioned. In addition, when the rule is the fuzzy rule, the suitability thereof is also set.

Figure 12A:
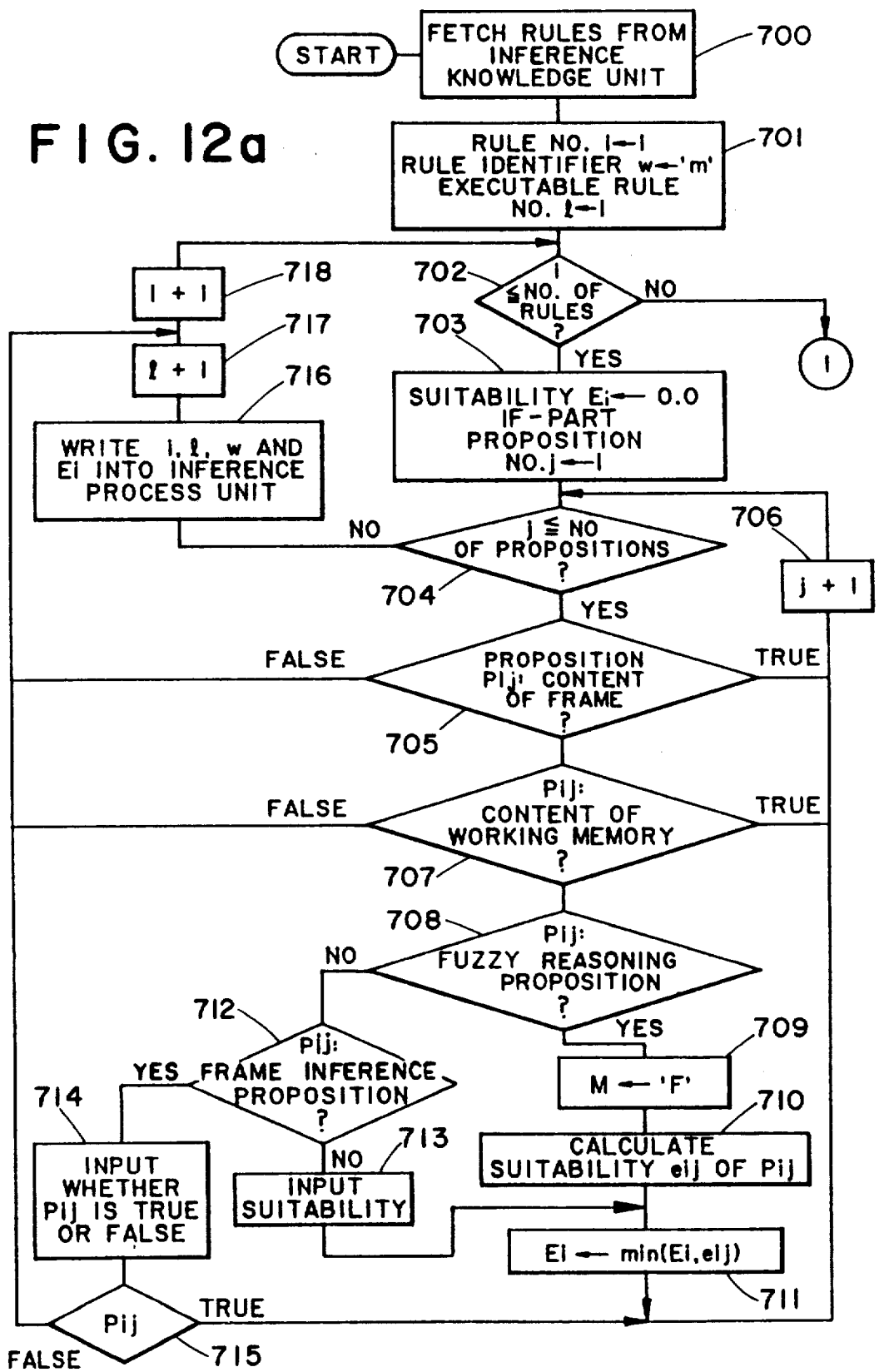
FIGS. 12a and 12b are flow charts showing the processing steps of the second embodiment.

FIGS. 12(a) and (b) are flow charts showing the processing steps in the knowledge discriminating unit 205.

Figures 12B, 13:
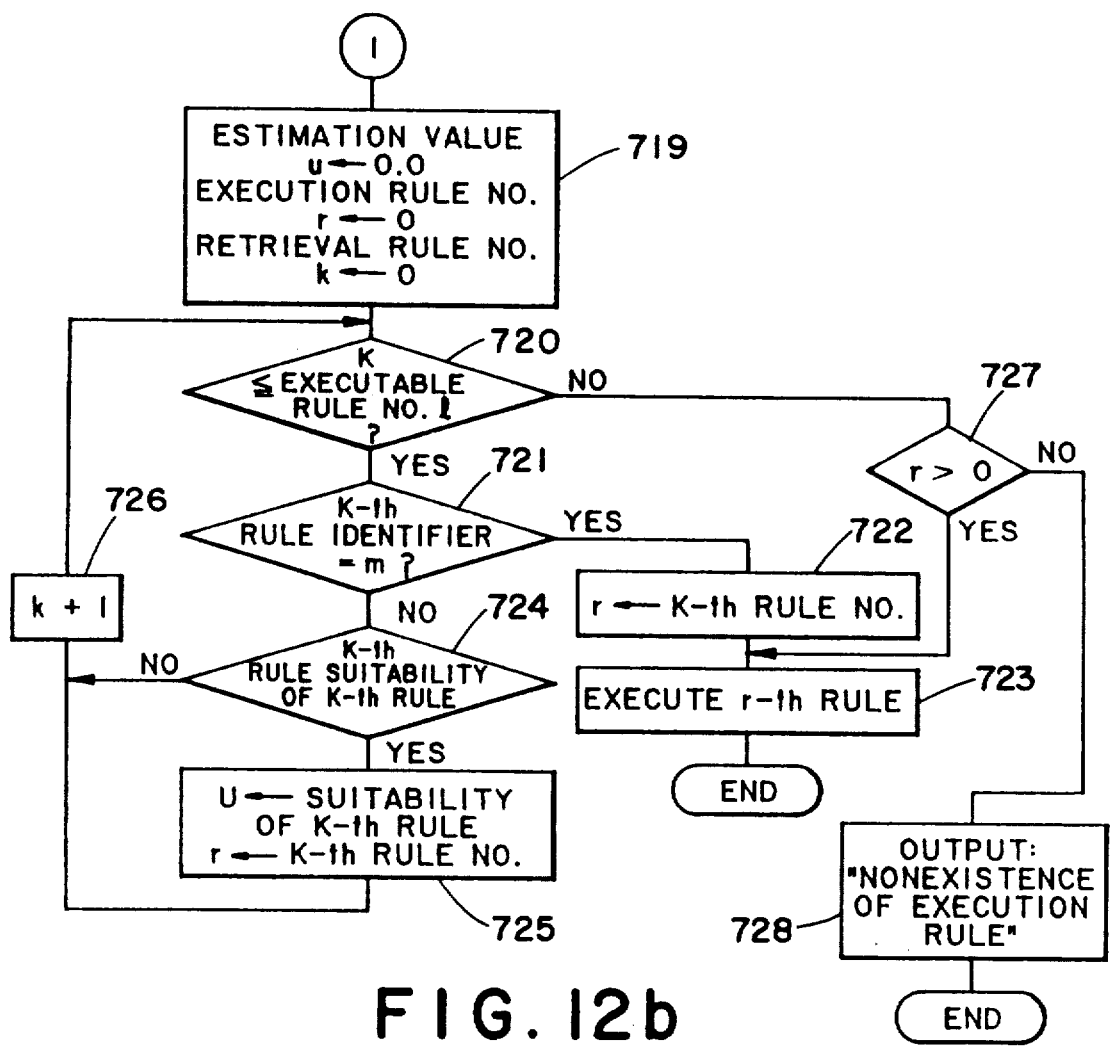
FIG. 13 is a diagram of the table format of a WM 100.

FIG. 13 is a table diagram of the WM 100. The WM 100 can describe inference processes in a number up to N, and can set inference process Nos. and inference process propositions.

Next, the operation of this embodiment will be described in detail with reference to FIGS. 12(a) and (b).

The contents of the inference knowledge unit 200 are fetched, and the number of rules is calculated (700), whereupon rule No. i is set to 1, a rule identifier W to 'M' and executable rule No. 1 to 1 (701).

If the rule No. i is not greater than the number of rules (702), the suitability Ei is set to 0.0, and the If-part proposition No. j is set to 1 (703). If the If-part proposition No. j is not greater than the number of the propositions of the i-th rule (704), the agreement between the If-part proposition $P_{ij}$ and a fact in a frame is checked (705). By way of example, when in the aforementioned (Rule-1), facts concerning the plan A are described in the following Plan-A frame:

| (Plan A | |
|---|---|
| Departure place | Tokyo |
| Arrival place | Kanazawa |
| Desired departure time | 9:00 |
| Desired arrival time | 15:00 |
| Degree of crowdedness | 1.0 | the inference unit 220 judges the If-part proposition of the (Rule-1) as being true with reference to the value of the departure place slot of the Plan-A frame. In the case where the If-part proposition is true at step 705, the If-part proposition No. j is rendered +1 (706), and the processing flow jumps to step 704. In a case where the If-part proposition is false, the processing flow jumps to a step 718. When 'true or false' cannot be decided at step 705, the content of the WM 100 is further examined to judge the If-part proposition $P_{ij}$ (707). When the If-part proposition $P_{ij}$ has been judged to be true, the processing flow jumps to step 706. When the If-part proposition $P_{ij}$ has been judged to be false, the processing flow jumps to step 718. By way of example, the If-part proposition of the (Rule-2), "The departure place of Plan A is not a large city" differs from the first inference process proposition of the WM 100 in FIG. 13, "The departure place of Plan A is a large city," and is therefore determined to be false. In a case where, at step 707, whether the If-part proposition: $P_{ij}$ cannot be decided as being true or false by the use of the content of the WM 100, if a name agreeing with the If-part proposition $P_{ij}$ exists, the proposition meaning table is checked (708). If it exist, the If-part proposition $P_{ij}$ is decided as being a fuzzy reasoning proposition.

By way of example, since a name agreeing with the If-part proposition of the (Rule-3) exists in the proposition meaning table 202 shown in FIG. 9, the proposition of "The desired departure time of Plan A is late" is determined to be a fuzzy reasoning proposition. When the If part proposition $P_{ij}$ is the fuzzy reasoning proposition at step 708, the rule identifier W is set to 'F' (709), and the suitability $e_{ij}$ of the If-part proposition $P_{ij}$ is calculated from the slot value of the frame which is pointed by the subject of the If-part proposition $P_{ij}$ and the membership function in the proposition meaning table 202 (710). By way of example, regarding to the If-part proposition of the (Rule-3), "The desired departure time of Plan A is late," the suitability $e_{ij}$ of the If-part proposition $P_{ij}$ becomes 0.75 on the basis of the desired departure time slot '9:00' of the plan A and the membership function 301 of "The desired departure time is late." Subsequently, the suitability $e_{ij}$ of the If-part proposition $P_{ij}$ and the suitability $E_i$ of the i-th rule are compared, and the smaller one is set as a new suitability $E_i$ of the i-th rule (711).

When the name agreeing with the If-part proposition $P_{ij}$ does not exist at step 708, whether the If-part proposition $P_{ij}$ is a frame inference proposition or a fuzzy reasoning-wise proposition is queried to the user, and it is input through the input unit 210 (712). When the If-part proposition $P_{ij}$ is the fuzzy reasoning proposition at step 712, the suitability $e_{ij}$ of the If-part proposition $P_{ij}$ is further input through the input unit 210 (713), and the processing flow jumps to step 711. When the If-part proposition $P_{ij}$ is the frame inference proposition at step 712, whether the If-part proposition $P_{ij}$ is true or false is input through the input unit 210 (714). If the proposition is true (715), the processing flow jumps to step 706. When the proposition is false, the processing flow jumps to step 718. Besides, when the If-part proposition No. j has become greater than the number of the If-part propositions of the i-th rule at step 704, the executable rule No. 1, rule No. i and rule identifier W are successively written into the inference process unit 400, together with the i-th rule suitability Ei when the i-th rule is the fuzzy rule (716), and the executable rule No. 1 is rendered +1. (717). Subsequently, the rule No. i is rendered +1 (718), and the processing flow jumps to step 702.

When the rule No. i is greater than the number of rules at step 702, a performance value u is set to 0.0, an execution rule No. r to 0 and a retrieval rule No. k to 1 (719). If the retrieval rule No. k is not greater than the executable rule No. 1 (720) and the identifier of the k-th executable rule is 'M' (721), the execution rule No. r is set to the k-th executable rule No. (722), and the Then-part proposition of the r-th rule is executed to end the processing (723).

If the identifier of the k-th executable rule is not 'M' at step 721, the suitability of the k-th executable rule is compared with the performance value u (724). When the suitability of the k-th executable rule is greater than the performance value u, it is set as the performance value u and the k-th rule No. is set as the execution rule No. r (725, whereupon the retrieval rule No. k is rendered +1 (726). When the suitability of the k-th executable rule is not greater than the performance value u at step 724, the processing flow jumps to step 726.

When the retrieval rule No. k is greater than the executable rule No. 1 at step 720, the execution rule No. r is checked (727). When the execution rule No. r is greater than 0, the processing flow jumps to step 723, and when not, the nonexistence of any executable rule is output to the output unit 230, and the processing is ended (728).

By the way, in the inference employing the fuzzy rules in this embodiment, a conclusion is drawn by the Then-part proposition of the rule which has a maximum suitability. For a fuzzy reasoning, there is a method wherein the center of gravity is evaluated from membership functions defining the Then-part propositions and is used as a center value. In that case, the center of gravity may be calculated by utilizing all the executable rules which are registered in the table of FIG. 11 formed by the inference process unit 400.

According to this embodiment, the frame inference and the fuzzy reasoning are executed while being automatically switched in dependence on the sorts of the If-part propositions of rules, and this is effective for the computerized implementation of complicated knowledge items on a large scale.

In addition, although a judgement based on uncertain knowledge items has been formed by the fuzzy reasoning in this method, it is also possible to utilize a certainty, a probability for the judgement, etc.

According to the present invention, a system can be constructed of only necessary knowledge items such as rules, and hence, is achieved the effect that the system becomes compact.

Moreover, an inference based on certain knowledge and an inference based on uncertain knowledge are caused to cooperate, whereby an inference process which is highly analogous to the inference of a human being can be attained.

Figure 14:
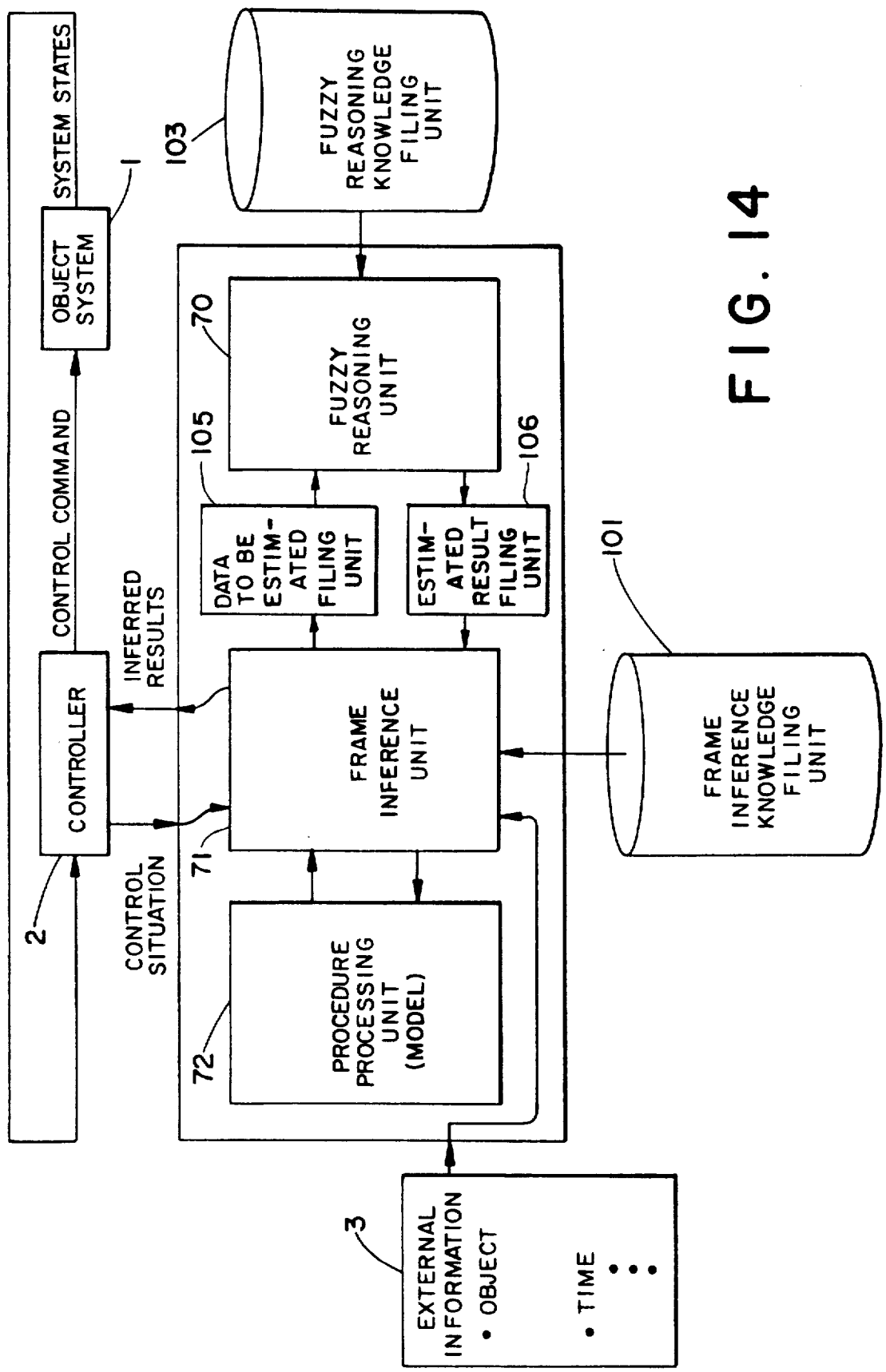
FIG. 14 is an overall structural view of the third embodiment of the reasoning method to accomplish the present invention.

FIG. 14 is an overall structural view of the reasoning method of third embodiment of the present invention. In the drawing, reference numeral 1 represents an object system such as a train; 2 is a control apparatus for the object system 1; 3 is external information such as the object of boiling water, time, and so forth; 101 is knowledge relating to logical judgement and more definitely, a frame inference knowledge base storing the frame inference rules and frames; 103 is a knowledge relating to intuitive judgement and more definitely, a fuzzy knowledge base storing the fuzzy rules and the membership function; and 7 is a reasoning apparatus which makes reasoning from the control state calculated from the control apparatus, the external information 3, the frame knowledge base 101 and the fuzzy knowledge base 103.

The reasoning apparatus 7 consists of a fuzzy reasoning portion 70 which executes for the intuitive judgement, a frame inference portion 71 which executes for the reasoning judgement and a procedure processing portion 72 for executing the procedure described in the corresponding frame when the fuzzy reasoning actuation is designated in the rule Then portion inside the frame knowledge base 101.

Now, it will be assumed that the following two rules are stored in the frame knowledge base 101:

Rule 1

If (A drink of a desired frame is coffee & a pattern of the desired frame is time)
Then (A knowledge base name of a fuzzy frame is set to a coffee knowledge & fuzzy reasoning is executed in the prediction frame) . . . (1)

Rule 2

If (A drink of a desired frame is tea & a pattern of the desired frame is time)
Then (A knowledge base name of the fuzzy frame is set to tea knowledge & fuzzy reasoning is executed in the prediction frame) . . . (2)

However, the second Then-part proposition of the rule Then portion described above means that fuzzy reasoning is made by use of each slot value of the prediction frame.

It will be assumed that the following three rules are stored in the fuzzy knowledge base 103:

Rule 3

When (heating power of the state frame is set to +0)
If (water temperature of the prediction frame is fairly good & the predicted consumption quantity is considerably small) . . . (3) Then (heating power of the prediction frame is set to +0).

Rule 4

When (heating power of the state frame is set to +1)
If (water temperature of the prediction frame is just good & the predicted consumption quantity is small)
Then (heating power of the prediction frame is set to +1) . . . (4)

Rule 3

When (heating power of the state frame is set to −1)
If (water temperature of the prediction frame is just good & the consumption quantity of the prediction frame is small) Then (heating power of the prediction frame is set to −1) . . . (5)

However, the rule of the type "When (X X X), If (. . .), Then (XXX)" and the rule of the type "If (. . .), Then (X X X)" will be hereinafter referred to as the "prediction type" and the "state type", respectively.

Figure 15:
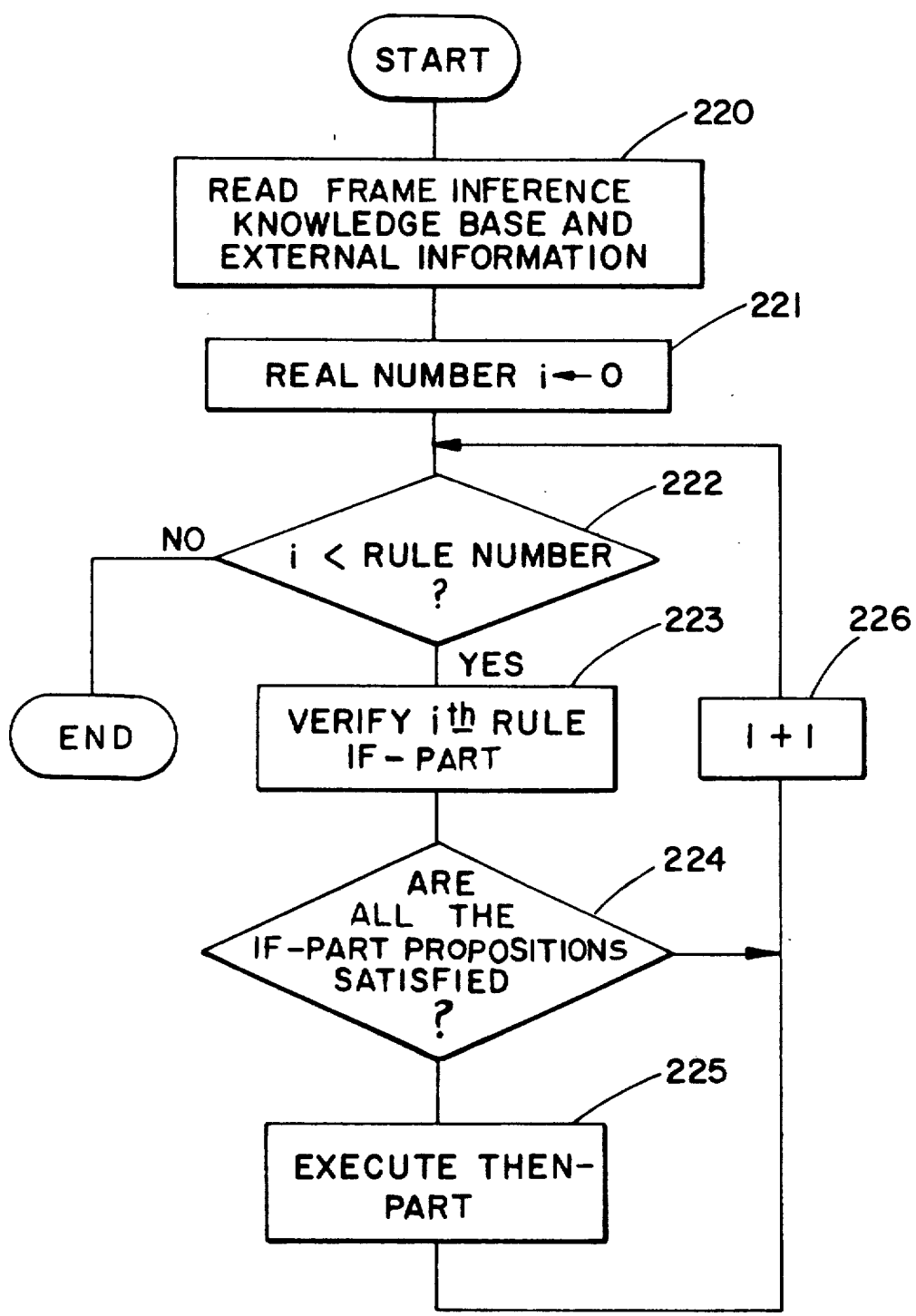
FIG. 15 is a flowchart showing the processing sequence of frame inference.

FIG. 15 is a flowchart showing the processing procedures of the frame inference in accordance with the present invention. Steps 220 to 226 represent the processings.

Figure 16:
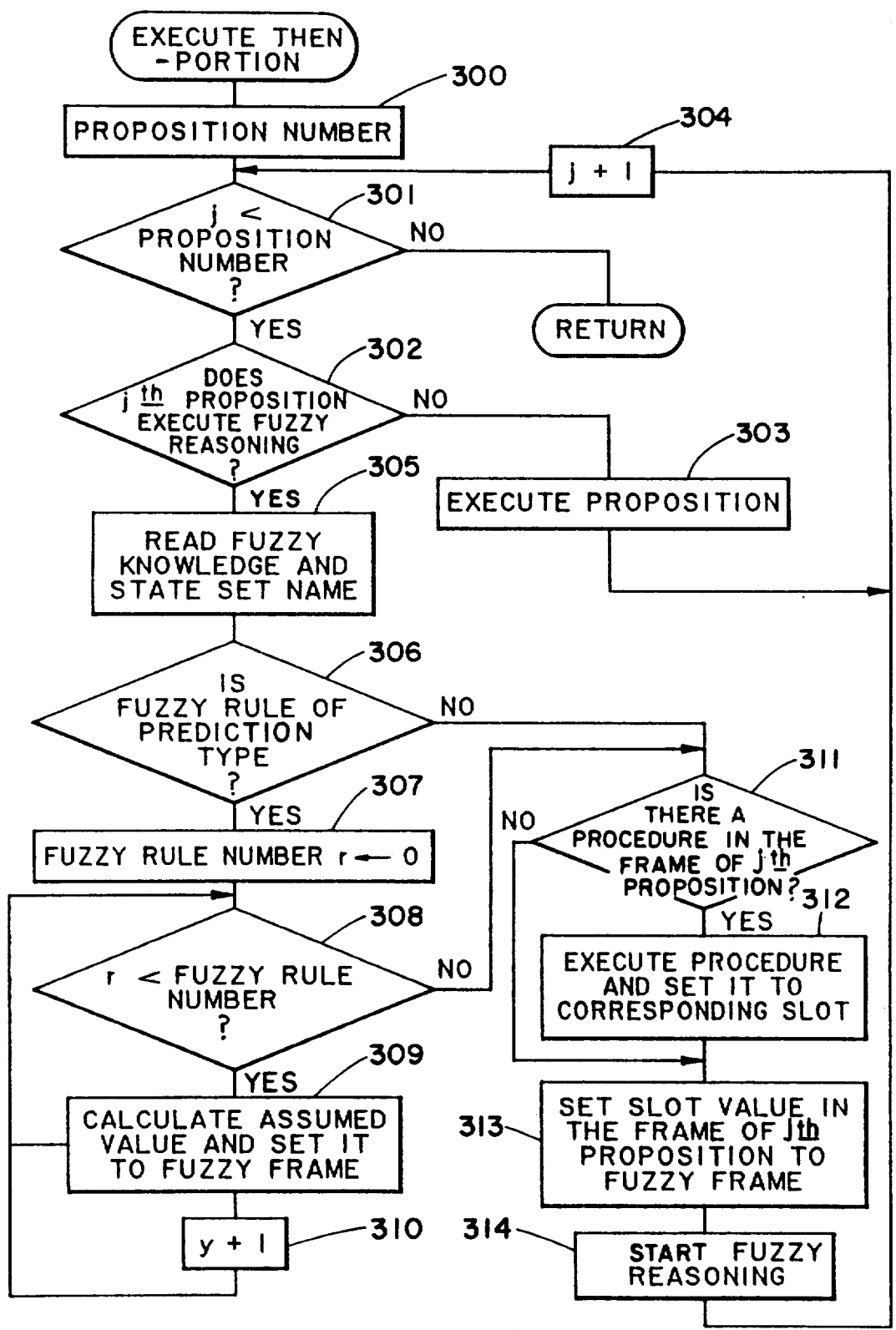
FIG. 16 is a flowchart showing the detailed sequence of the of the Then-part execution of the frame inference.

FIG. 16 is a flowchart showing the detailed procedure of processing 224 of the Then-part execution of the frame inference in the present invention. Steps 300 to 314 represent the processings.

Figure 17:
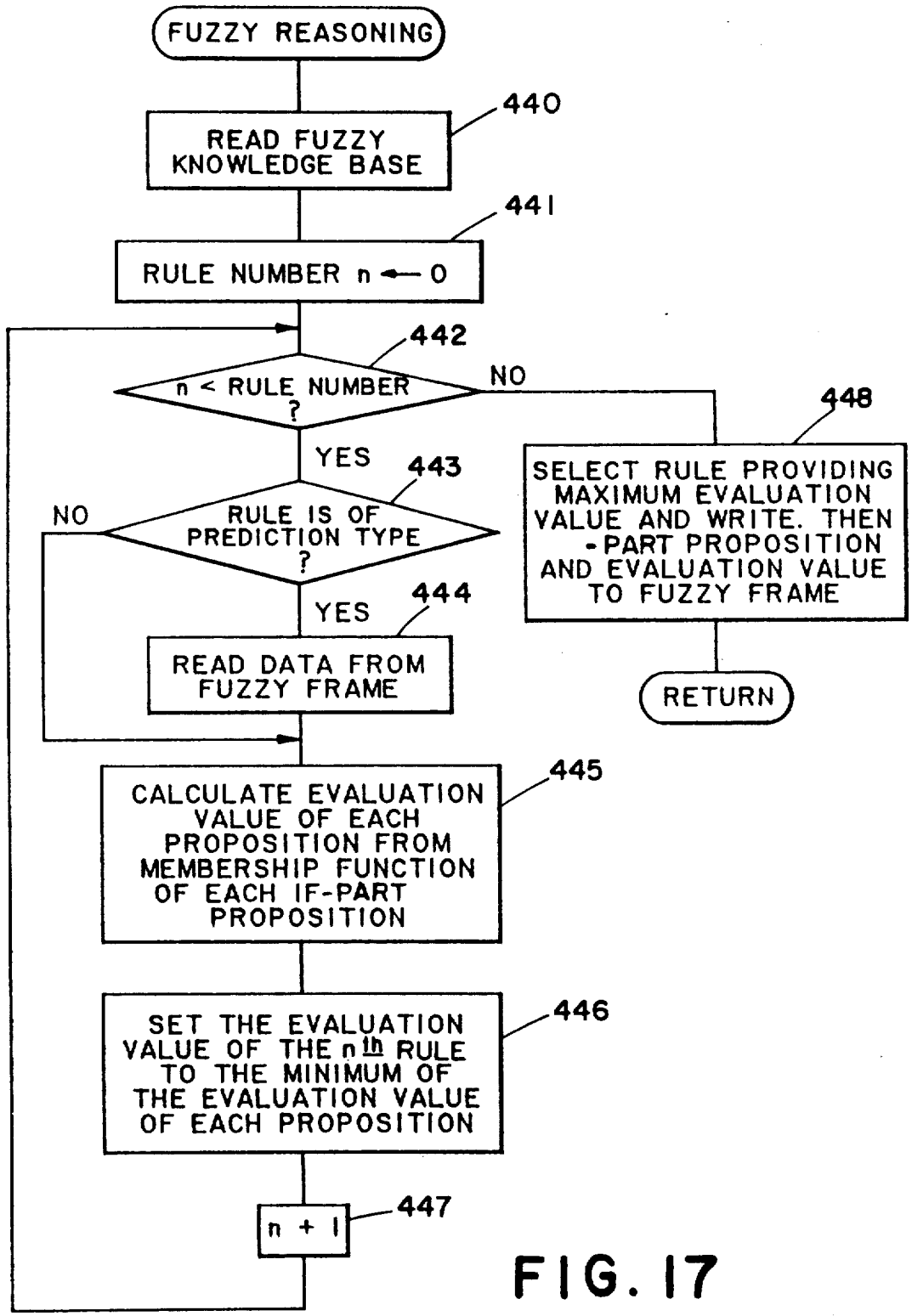
FIG. 17 is a flowchart showing the processing sequence of fuzzy reasoning.

FIG. 17 is a flowchart showing the processing procedures of the fuzzy reasoning in the present invention. Steps 440 to 448 represent the processings.

FIG. 18 shows the hierarchy of the frames stored in the frame knowledge base 101. In FIG. 18, the user frame and the fuzzy frame are frames peculiar to the present invention, and a desired frame, a state frame and a prediction frame below them are set arbitrarily by the user. The lower order frames can make reference to the upper order frame slots keeping the property and can execute the procedures (model).

FIG. 19 shows the structure of the fuzzy frame. The knowledge base name, the assumption value, the state name, the state value, the result and the degree of certainty are prepared as the slots and the fuzzy reasoning execution and read are prepared as the procedures. The knowledge base name slot is of a character type and designates the name of the fuzzy knowledge base 6. The assumption value slot is a real number type queue and can set a maximum of 30 conclusion values assumed in each fuzzy rule when the fuzzy rule is of the predictive fuzzy reasoning type. The state name slot is a character type queue and can set maximum 10 slot names of the frame designated when the fuzzy reasoning execution procedure is described. The state value slot is a real number type queue which sets the state calculated on the basis of each assumption value slot value. The result slot is of the character type which sets the result proposition of fuzzy reasoning. The certainty slot is of the real number type which sets the degree of conformity of the Then-part proposition. The fuzzy reasoning execution procedure is described in the Then-part proposition of the frame rule inside the frame knowledge base 5 together with the frame name. This procedure makes fuzzy reasoning on the basis of the information designated to the Then-part and its definite processing is shown already in FIG. 16.

FIG. 20 shows the structure of the desired frame. This frame is for setting the desire of the user, and consists of the slots of the drink, pattern, desired hour and desired time. The drink slot is of the character type and sets the drink desired by the user such as coffee, tea, etc. The pattern is of the character type. It designates "hour" if the user's desire is to "have a cup of coffee at 15:00" and designates the "time" if the user's desire is "have a cup of coffee after 10 minutes". The desired hour slot is of an integer type and sets the hour at which water is boiled as desired by the user if the pattern slot value is "hour". The desired time slot sets the time till water is boiled as desired by the user if the pattern slot value is "time".

FIG. 21 shows the condition frame. It is for representing the present condition and consists of the frames of hour, heating power, water temperature and water quantity. Each of the hour, heating power, water temperature and water quantity frames is of the real number type and sets the present value of each of them.

Figures 22, 23A, 23B, 23C:
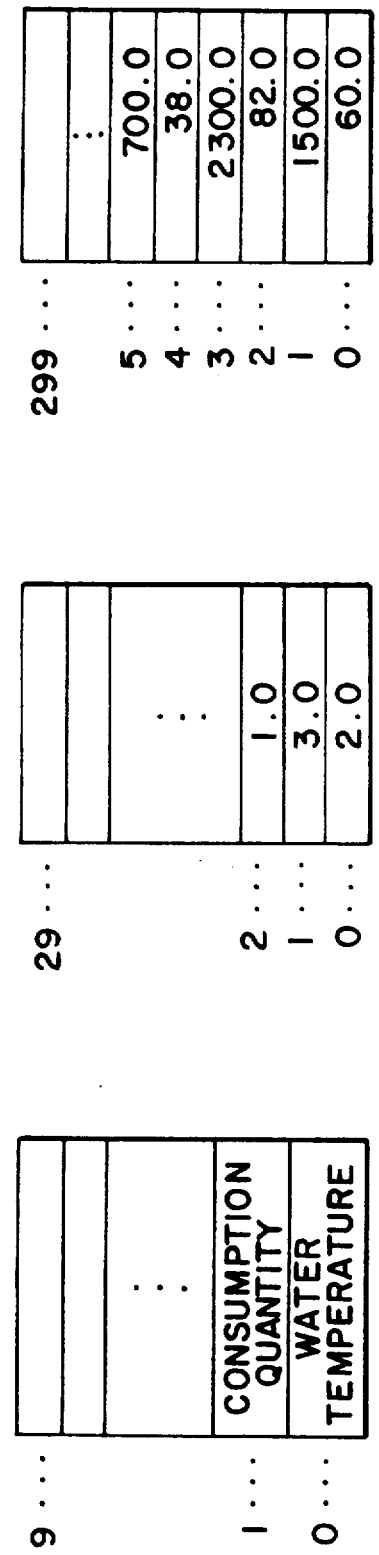
FIG. 22 is an explanatory view of the configuration of a prediction frame.
FIGS. 23a-23c are an explanatory view of a table of a fuzzy frame.

FIG. 22 shows the structure of the prediction frame. The prediction frame is for determining the water temperature and the consumed energy that are predicted on the basis of the heating power assumed by the rule in the fuzzy knowledge base 103. It consists of the slots of water temperature and consumed quantity and two procedures (models) of water temperature calculation and energy calculation. The water temperature slot is a queue of the real number type and determines and sets the predicted water temperature by the water temperature calculation procedure (model). The consumed quantity slot is a queue of the real number type and sets the predicted energy use quantity determined by the energy calculation procedure (model).

The water temperature calculation procedure (model) calculates the water temperature after the desired time if the pattern slot of the desired frame is time and the water temperature at the desired hour if the pattern slot is hour, by use of the desired frame and the condition frame. Similarly, the energy calculation procedure (model) calculates the energy consumed till the desired hour if the pattern slot is hour and the energy consumed till the desired time if the pattern slot is time.

FIG. 23 is a table of the fuzzy frame. In FIG. 23(a) represents the content of the condition name slot, which stores each slot name of the prediction frame shown in FIG. 22 and (b) represents the content of the assumption value slot and stores the numeric values assumed by the fuzzy rules (3) to (5). Designator (c) represents the content of the condition value slot and takes out and sets each prediction value in the fuzzy rules (3) to (5) from each slot of the water temperature and consumed quantity.

Figure 24B:
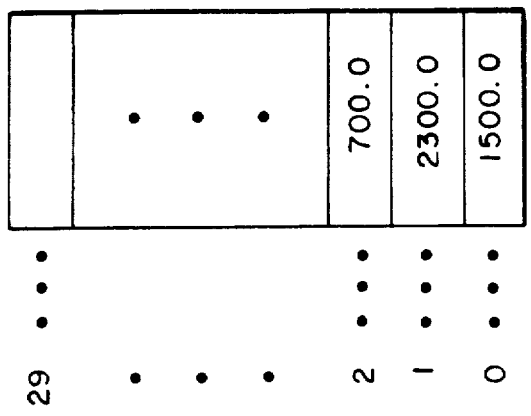
FIGS. 24a and 24b are an explanatory view of a table of a prediction.

FIG. 24 is a prediction frame table. In the drawing, (a) calculates the predicted water temperature when the heating power assumed by the fuzzy rules (3) to (5) is 2.0, 3.0 and 1.0, respectively, by use of the water temperature calculation procedure (model) and stores each predicated water temperature. (b), too, calculates the predicted consumption quantity in the fuzzy rules (3) to (5) and stores it.

Figure 25B:
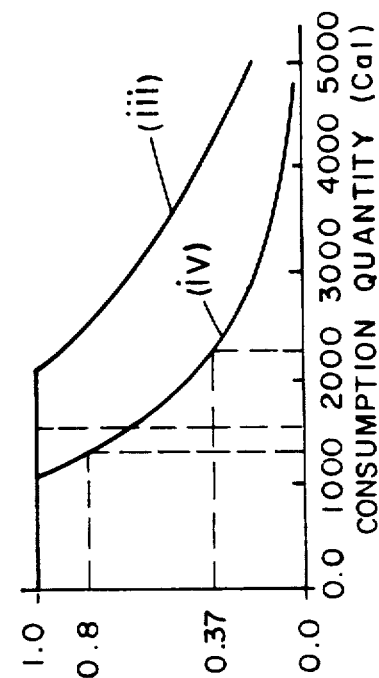
FIGS. 25a and 25b are an explanatory view showing a membership function.
Figure 25A:
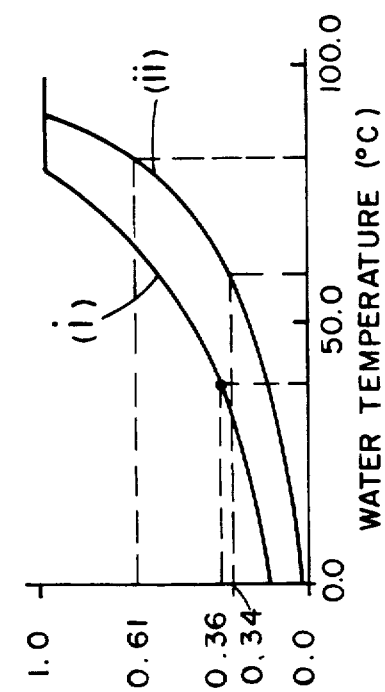

FIG. 25 shows a membership function. In the drawing, (i), and (ii) use the water temperature as the evaluation index and (a) defines that "the water temperature is fairly good" while (b) does that "the water temperature is just good". (c) and (d) use the consumed quantity as the evaluation index and (c) defines that "the consumed quantity is rather small" while (d) does that "the consumed quantity is small".

Next, the operation of this embodiment will be described in detail with reference to FIGS. 14 to 17.

The frame inference portion 71 of the reasoning apparatus 7 first reads the rule in the frame knowledge base 101 and the external information 3 such as the present time and sets them to the corresponding slots of the frame (220) and sets the rule number i to 0 (221). If the rule of the frame knowledge base 101 is the afore-mentioned rule group (1), for example, it reads this rule group. If the present time is 14:50, if the user's desire is "to have a cup of coffee at 15:00" and if the present water temperature, water quantity and heating power are 24° C., 270 cc and 0, respectively, the values 14:50, 0.0, 24.0 and 270.0 are set to the slots of the hour, heating power, water temperature and water quantity of the condition frame, respectively, while "coffee", "hour" and 15:00 are set to the slots of the drink, pattern and desired time of the desired frame, respectively.

Next, if the rule number i is below the rule number (222), the ith rule If-part is verified (223). If the rule inside the frame knowledge base 101 is the aforementioned formula (1), the rule number i is 1, the drink slot of the desired frame is "coffee" and the pattern slot is "hour", judgement is made to the effect that the first proposition of the rule (1), that is, "the drink of the desired frame is coffee", and the second proposition, that is, "the pattern of the desired frame is hour", are satisfied. If all the If-part propositions are found satisfied as the result of judgement (224), the Then-part is executed (225).

The Then-part is executed definitely as follows. First of all, the proposition number j is set to 0 (300). If the proposition number j is less than the number of propositions of the Then-part of the ith rule (301), whether or not the procedure of the fuzzy reasoning execution is described in the jth proposition is judged (302). If this procedure is not described, the jth proposition is executed (303), the proposition number j is incremented by one (304) and the flow jumps to step 301. If the If-part proposition of the aforementioned rule, formula (1), is satisfied, "coffee knowledge" is set to the knowledge base name slot of the fuzzy frame by the first Then-part proposition.

If the jth proposition is fuzzy reasoning execution at step 302, the knowledge in the knowledge base designated to the knowledge base name slot of the fuzzy frame is read and the slot names of the frame determined by the jth proposition are sequentially set to the condition name slot of the fuzzy frame (305). In the case of the second proposition of the rule (1), for example, since coffee knowledge is set to the knowledge base slot of the fuzzy frame by the first proposition, the content of the coffee knowledge is read and then the "water temperature" and the "consumed quantity" as the slot names of the prediction frame are sequentially preserved in the condition name slots of the fuzzy frame, as shown in FIG. 23(a).

Next, whether or not the rule in the fuzzy knowledge base 103 read at step 305 is of the prediction type is judged (306) and if it is, the fuzzy rule number r is set to 0 (307). If the fuzzy rule number r is below the fuzzy rule number (308), the conclusion value assumed by the rth fuzzy rule is calculated and set to the assumed value slot in the fuzzy rule frame. The fuzzy rule number r is incremented by +1 (310) and the flow jumps to step 308. If the fuzzy rule is the aforementioned formulas (3) to (5) and the heating power of the condition frame is 2.0, the assumed values of the fuzzy rules (3) to (5) are 2.0, 3.0 and 1.0, respectively, and the assumed value slot in the fuzzy rule frame becomes such as one shown in FIG. 23(b).

Figure 24A:
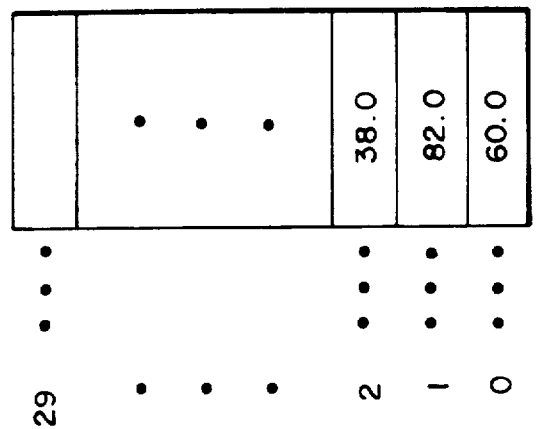

If the fuzzy rule is not of the prediction type at step 306 or if the fuzzy rule number r is above the fuzzy rule number, whether or not the procedure (model) name is also described in each slot of the frame described in the jth proposition is verified (311). If the slot where the procedure (model) is also described exists, that procedure (model) is executed on the basis of each assumed value which is assumed by the fuzzy rule and the result is set to the corresponding slot (312). For example, the prediction frame is designated in the second proposition of the aforementioned frame rule (1). At this time, each slot of the water temperature and consumed quantity of the prediction frame in FIG. 22 describes also the water temperature calculation and the energy calculation. Therefore, the procedure processing portion 72 calculates the predicted water temperature and the predicted consumed quantity when heating is made at the heating power of 2.0 which is assumed by the fuzzy rule (3), by use of these procedures (model). The results of calculation are 60° C. and 1,500 cal, respectively. The procedures (model) are also executed for the fuzzy rules (4) and (5), and is will be hereby assumed that the predicted water temperature and the predicted consumed quantity are 82° C. and 2,300 cal at the assumed heating power of 3.0 by the rule (4) and 38° C. and 700 cal at the assumed heating power of 1.0 of the fuzzy rule (5), respectively. These predicted values are set to the water temperature slot and the consumed quantity slot as shown in FIGS. 24(a) and (b).

If the procedure (model) name is not also described in all the slots in the fuzzy frame described by the jth proposition at step 311 or if the procedure of step 312 is not executed, the procedure of step 313 is executed.

At this step 313, each slot value in the frame described by the jth proposition is set to the condition value slot of the fuzzy frame. This setting is made in the sequence of the predicted result by use of the predicted value of the first fuzzy rule, the predicted result by use of the predicted value by the second fuzzy rule, and so forth (313). If the water temperature slot and the consumed quantity slot of the prediction frame designated by the frame rule (1) are such as those shown in FIGS. 24(a) and (b), for example, condition value slots of the prediction frame are such as those shown in FIG. 23(c).

The fuzzy reasoning is executed after step 313 (314). The execution of the fuzzy reasoning will be described with reference to FIG. 17.

First of all, the fuzzy reasoning portion 70 reads the fuzzy rule and the membership function in the fuzzy knowledge base 103 (440) and sets the rule number n to 0 (441). If the rule number n is less than the rule number (442) and if the rule number n is 0 or if the fuzzy rule is of the prediction type (443), it takes out one data from the assumed value slot of the fuzzy frame and also the data (condition values) in the same number as the number of the condition names stored in the condition name slot, from the condition value slot (444). Next, it calculates the evaluation value of the If-part proposition from the condition value for each If-part proposition of the nth fuzzy rule and from the membership function defining the meaning of that If-part proposition (445) and adopts the smallest one among the evaluation values of the proposition constituting the nth fuzzy rule as the nth fuzzy rule evaluation value (446).

It will be assumed, for example, that the aforementioned fuzzy rules (3) to (5) and the membership function shown in FIG. 25 are stored in the fuzzy knowledge base 103. First of all, the zero number rule or more definitely, the assumed value 2.0, the water temperature 60.0 and the consumed quantity 1,500.0 in the fuzzy rule (3), is taken out, and the evaluation value of "the water temperature is fairly good" (b) is 0.36 and the evaluation value of "the consumed quantity is considerably small" (c) is 1.0 from the membership function of FIG. 25. In this manner, the evaluation 0.36 of the 0th rule is determined.

After the evaluation value of the nth rule is determined by steps 443 to 446, the rule number n is incremented by +1 (447) and the flow jumps to step 442.

If the rule number n is above the fuzzy rule at step 442, the fuzzy rule having the greatest evaluation value is selected and the proposition described in the Then-part of the selected fuzzy rule is set to the result slot of the fuzzy frame and to the conformity slot of the maximum evaluation value fuzzy frame, thereby completing the fuzzy reasoning (448). If the evaluation values of the fuzzy rules (4) and (5) are determined in the same way as the evaluation value 0.36 of the aforementioned fuzzy rule (3), they are 0.37 and 0.34, respectively, so that the Then-part proposition of the fuzzy rule (4), that is, "heating power is incremented by +1", is set to the result slot of the fuzzy frame while 0.37 is set to the conformity slot.

When the fuzzy reasoning is complete, the flow jumps to step 304. If the proposition number j is above Then-part proposition of ith rule at step 301, the Then-part portion execution portion is finished.

If the Then-part execution step (225) is completed or if any are not satisfied in the If-part proposition of the ith frame rule, the rule number i is incremented by one (226) and the flow jumps to step 222. If the rule number i is above the frame rule number at step 222, all the processings are finished.

In accordance with the present invention, if the frame inference knowledge and the fuzzy reasoning knowledge are constituted separately, the prediction calculation and reasoning are executed automatically on the reasoning engine side. Therefore, the predictive fuzzy reasoning system becomes feasible and at the same time, the user can easily configurate the knowledge.

Figure 26:
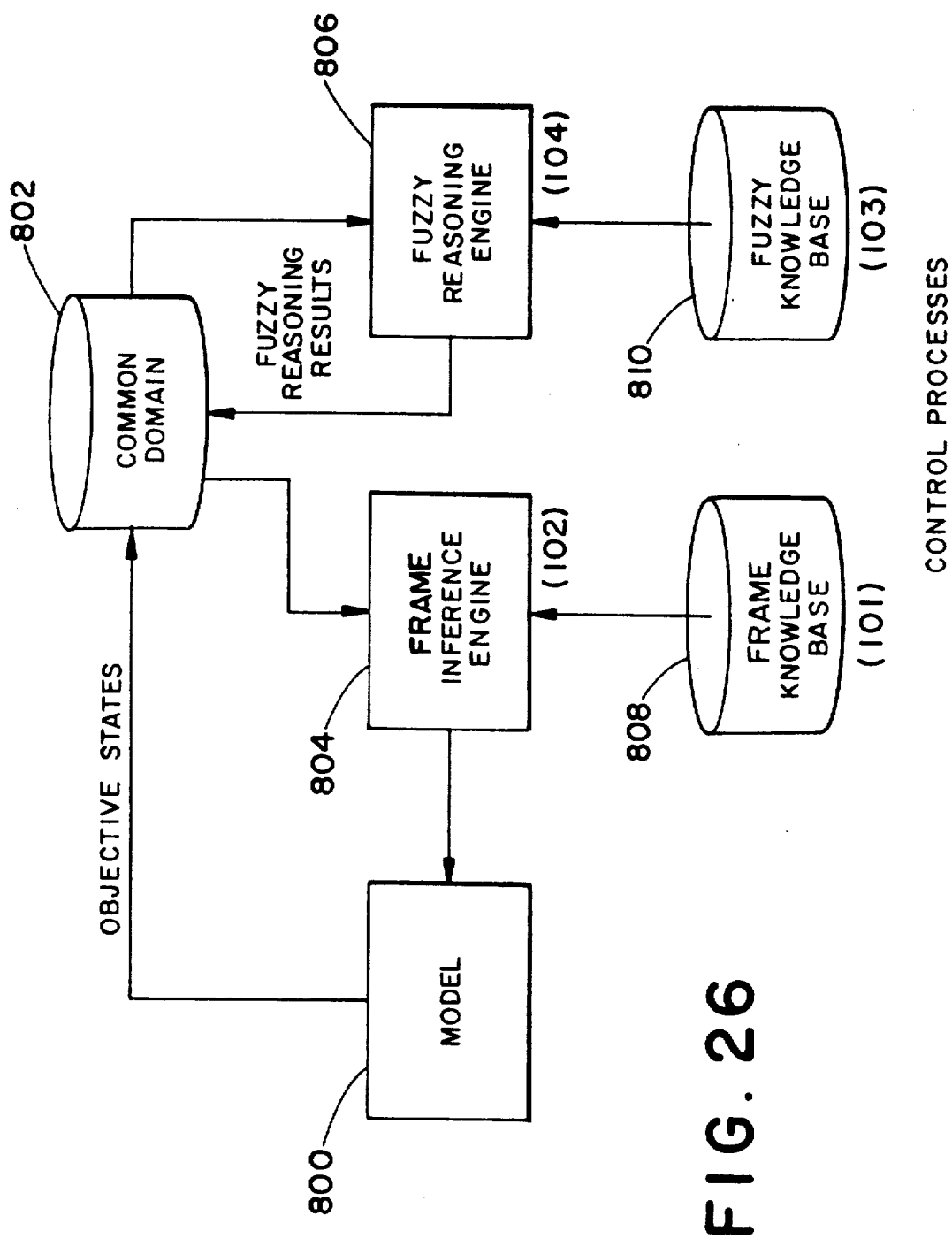
FIG. 26 is a block diagram of the subject invention in a control system environment utilizing a procedure (model) for predicting system.

Turning now to FIG. 26, a variation in which the subject inferencing system is embodied in a process controls environment will be described. In this embodiment a procedure (model) 800 is suitably formed as a software-based system which models a system state. Frame inference engine outputs data representative of a present condition to the procedure (model) 800, which procedure (model) outputs data representative of objective states of the system to a common domain element 802. The common domain element 802 performs functions analogous to the data to-be-estimated filing unit 105 and the estimated result filing unit 106 (FIG. 1).

The common domain 802 communicates its output data to one of a frame inference engine 804 and a fuzzy reasoning engine 806. Conclusions of the frame inference engine 804 are achieved in conjunction with data stored in the frame knowledge base 808. Fuzzy reasoning in the fuzzy reasoning engine 806 is achieved by use of data stored in a conjunction with data of the fuzzy knowledge base 810.

Output of the fuzzy reasoning engine 806 is channelled through the common domain 802, ultimately back to the frame inference engine 804. The frame inference engine outputs data, in turn, representative of the present condition of the system, to the procedure (model) 800. The process then recurs in cyclic fashion.

Having thus described the invention, it is now claimed:

1. An inferencing method comprising the steps of:
   (a) fetching frame rules from a frame inference knowledge filing unit, in which each frame rule includes at least one proposition, each proposition including an If-part and a Then-part, into a frame inference unit;
   (b) receiving state data representative of a state of an object system into the frame inference unit;
   (c) comparing, in the frame inference unit, an If-part of a frame rule to the state data acquired in step (b);
   (d) determining, in the frame inference unit, a match of a frame rule and the state data;
   (e) testing, in the frame inference unit, a Then Part of a matched frame rule for selectively placing a call to y (i) a frame inference and (ii) a fuzzy reasoning;
   (f) performing upon determination of a call to a fuzzy reasoning in step (e), the steps of,
      (i) writing inference data of a matched frame rule to a data to be estimated filing unit, and
      (ii) commencing, in a fuzzy reasoning engine, a fuzzy reasoning in conjunction with data in the data to be estimated filing unit; and
      (iii) completing a fuzzy reasoning in accordance with the data in the data to be estimated filing unit and by use of selected at least one of a plurality of fuzzy rules in a fuzzy reasoning knowledge filing unit to form fuzzy reasoning result data; and (g) performing, in the frame inference unit upon determination of a call to a frame inference in step (e), the step of executing a Then-part of the frame rules corresponding to an If-part of a matched frame rule.

2. The inferencing method of claim 1 wherein step (f) further includes the steps of:
 (iv) writing the fuzzy reasoning result data to an estimated result filing unit; and
 (v) outputting the fuzzy reasoning result data from the estimated result filing unit.

3. The inferencing method of claim 2 further comprising the steps of:
 (h) repeating steps (a) through (e) until each frame rule in the frame inference knowledge filing unit has been considered; and
 (i) repeating steps (f) and (g) until all propositions of a matched rule have been considered.

4. The inferencing method of claim 3 wherein the step (f)(iii) includes the steps of:
 (1) determining a selected inference scheme from the inference data of the data to be estimated filing unit; and '(2) determining the fuzzy reasoning result data in accordance with an inference scheme determined from the inference data.

5. The inferencing method of claim 1 further comprising the steps of repeating steps (a) through (e) until each frame rule in the frame inference knowledge filing unit has been considered.

6. An inferencing method according to claim 1, wherein said frame rules and fuzzy rules are stored in a memory on a microprocessor.

7. A method of hybridized frame inferencing and fuzzy reasoning comprising the steps of:
 receiving state data representative of a current state of an object system into a frame inference unit;
 performing, in the frame inference unit, frame inference on a condition of the object system in accordance with the state data to achieve a frame inference result; and
 selectively performing, in a fuzzy reasoning engine, selected at least one of a plurality of fuzzy reasoning schemes in accordance with the frame inference result.

8. An inferencing method comprising the steps of:
 (a) fetching rules from an inference knowledge filing unit for storing frame rules and fuzzy rules mixedly, in which each of these rules includes at least one proposition including an If-part and a Then-part, into a frame inference unit;
 (a2) discriminating, in the frame inference unit, whether the fetched rules are for completing a frame inference or a fuzzy reasoning;
 (b) receiving, into the frame inference unit, state data representative of a state of an object system;
 (c) comparing, in the frame inference unit, an If-part of a discriminated frame rule to the state data acquired in step (b);
 (d) determining, in the frame inference unit, a match of a discriminated frame rule and the state data;
 (e) testing, in the frame inference unit, the Then Part of a matched frame rule for a call to at least one of a frame inference and a fuzzy reasoning;

(f) performing, in the frame inference unit, upon determination of a call to a fuzzy reasoning in step (e), the steps of,
 (i) writing inference data of a matched frame rule to a data to be estimated filing unit, and
 (ii) commencing selected at least one of a plurality of fuzzy reasoning schemes, in a fuzzy reasoning engine, in conjunction with data in the data to be estimated filing unit; and
 (iii) completing a fuzzy reasoning in accordance with the data in the data to be estimated filing unit and by use of the fuzzy rules to form fuzzy reasoning result data; and (g) performing, upon determination of a call to a frame inference in step (e), the step of executing a Then-part of the frame rules corresponding to an If-part of a matched frame rule.

9. An inferencing method according to claim 8, wherein said frame rules and fuzzy rules are stored in a memory on a microprocessor.

10. An inferencing method comprising the steps of:
 (a) fetching frame rules into a frame inference unit from a frame inference knowledge filing unit, in which each frame rule includes at least one proposition, each proposition including an If-part and a Then-part;
 (b) receiving state data representative of a current state of an object system into the frame inference unit;
 (c) comparing, in the frame inference unit, an If-part of a frame rule to the state data acquired in step (b);
 (d) determining, in the frame inference unit, a match of a frame rule and the state data;
 (e) testing, in the frame inference unit, result data of a matched frame rule a call to at least one of (i) a frame inference and (ii) a fuzzy reasoning;
 (f) performing, in a fuzzy reasoning engine, upon determination of a call to a fuzzy reasoning in step (e), the steps of,
  ($f_1$) fetching fuzzy rules from a fuzzy reasoning knowledge filing unit,
  ($f_2$) determining from the fetched fuzzy rules for a call to at least one of a state-estimative type fuzzy reasoning and a predictive fuzzy reasoning,
  ($f_3$) performing, upon determination of a call to a predictive fuzzy reasoning in step ($f_2$), the steps of:
   (i) predicting results data from a current state data of the object system, by use of a model for realizing an operation or a situation of the object system, and
   (ii) completing a fuzzy reasoning in accordance with the predicted results data to form fuzzy reasoning result data.

11. An inferencing method according to claim 10, wherein said predicting step further includes:
 a step of writing the predicted result data in a data to be estimated filing unit.

12. An inferencing method according to claim 10, wherein said frame rules and fuzzy rules are stored in a memory on a microprocessor.

13. An inferencing system comprising:
 means for receiving state data representative of a current state of an object system;
 means for communicating the state data to a frame inference engine;

data to be estimated filing unit means for accumulating fuzzy call data representative of a call to a fuzzy reasoning engine;

means for communicating the fuzzy call data from the data to be estimated filing unit to a fuzzy reasoning engine;

a fuzzy reasoning engine including, means for selecting at least one of a plurality of inference schemes from the fuzzy call data, means for determining fuzzy reasoning result data from the fuzzy call data in accordance with a determined inference scheme, and means for communicating the fuzzy reasoning result data to an estimated result filing unit; and estimated result data filing unit means for outputting the fuzzy reasoning result data to the frame inference engine.

14. An inferencing system comprising:

a frame inference knowledge filing unit for storage of a plurality of frame rules, wherein each frame rule includes data representative of at least one proposition, each proposition including an If-part data and a Then-part data;

means for communicating frame rules from the frame inference knowledge filing unit to a frame inference unit;

means for communicating state data representative of a current state of an object system to the frame inference unit;

the frame inference unit including, comparing means for comparing an If-part of a frame rule stored in the frame inference knowledge filing unit to the state data, means for determining a match of a frame rule and the state data, testing means for testing Then Part of a matched frame rule for a call to at least one of (i) a frame inference and (ii) a fuzzy reasoning, and means for performing, upon determination of a call to a fuzzy reasoning, writing of inference data of a matched frame rule to a data to be estimated filing unit;

a fuzzy reasoning engine means for commencing a selected of a plurality of fuzzy reasoning inference schemes in conjunction with data in the data to be estimated filing unit;

means for completing a fuzzy reasoning in accordance with the data in the data to be estimated filing unit to form fuzzy reasoning result data and by use of fuzzy rules in a fuzzy reasoning knowledge filing unit; and means for executing, upon determination of a call to a frame inference, a Then-part of the frame corresponding to an If-part of a matched frame rule.

15. The inferencing system of claim 14 wherein the fuzzy reasoning engine includes:

means for determining a selected inference scheme from the inference data in the data to be estimated filing unit; and means for writing the fuzzy reasoning result data to an estimated result data filing unit.

16. An inferencing system according to claim 14, wherein said frame rules and fuzzy rules are stored in a memory on a microprocessor.

17. An inferencing system comprising:

means for receiving state data representative of a current state of an object system;

means for communicating the state data with an inference unit;

the inference unit including, a knowledge discrimination unit means for determining whether a frame inference or a fuzzy reasoning is to be completed, a frame inference unit for receiving the state data, data to be estimated filing unit means for accumulating fuzzy call data representative of a call to a fuzzy reasoning engine, the fuzzy reasoning engine including means for determining selected at least one of a plurality of inference schemes from fuzzy call data, means for determining fuzzy reasoning result data from the fuzzy call data in accordance with a determined inference scheme, and means for communicating the fuzzy reasoning result data to an estimated result filing unit, and an estimated result filing unit means for outputting the fuzzy reasoning result data to the frame inference unit;

means for querying a user for data identifying whether state data signifies a frame inference or a fuzzy inference, which querying is undertaken when completion of a frame inference or a fuzzy reasoning has not been determined by the knowledge discrimination unit.

18. An inferencing system comprising:

an inference knowledge filing unit for storage of a plurality of frame rules and fuzzy rules mixedly, wherein each rule includes data representative of at least one proposition, each proposition including an If-part data and a Then-part data;

means for fetching rules from the inference knowledge filing unit;

means for discriminating whether the fetched rules are for completing a frame inference or a fuzzy reasoning;

inference process storing unit for storage of executable rules in the discriminated rules;

working memory unit for storage of intermediate frame inference result data;

means for receiving state data representative of a current state of an object system;

means for executing, upon discrimination for completing a frame inference, frame rules matched to the state data by use of the contents of the inference process storing unit and working memory unit;

data to be estimated filing unit for storage of a frame inference result data; and means for executing in a fuzzy reasoning engine, upon discrimination for completing a fuzzy reasoning, selected at least one of a plurality of fuzzy rules in accordance with the data in the data to be estimated filing unit.

19. The inferencing system of claim 18, wherein said means for executing fuzzy rules includes:

means for determining a selected inference scheme from the inference data in the data to be estimated filing unit; and means for writing the fuzzy reasoning result data to an estimated result filing unit.

20. An inferencing system according to claim 18, wherein said frame rules and fuzzy rules are stored in a memory on a microprocessor.

* * * * *

UNITED STATES PATENT AND TRADEMARK OFFICE
CERTIFICATE OF CORRECTION

PATENT NO. : 5,175,795

DATED : December 29, 1992

INVENTOR(S) : Ryuko Tsuda, et al.

It is certified that error appears in the above-identified patent and that said Letters Patent is hereby corrected as shown below:

Claim 4, column 21, line 26, delete the " ' " before "(2)".

Claim 10, column 22, line 35, after "rule" insert --for--.

Claim 10, column 22, line 39, delete the "," following "of" and replace it with --:--.

Claim 14, column 23, line 44, after "selected" insert --at least one--.

Signed and Sealed this

Nineteenth Day of October, 1993

Attest:

BRUCE LEHMAN

*Attesting Officer*   *Commissioner of Patents and Trademarks*